United States Patent
Majeed et al.

(10) Patent No.: US 12,401,657 B2
(45) Date of Patent: Aug. 26, 2025

(54) AGGREGATING CERTIFICATE AUTHORITY CERTIFICATES FOR AUTHENTICATING NETWORK ENTITIES LOCATED IN DIFFERENT TRUST ZONES

(71) Applicant: Oracle International Corporation, Redwood Shores, CA (US)

(72) Inventors: Haya Majeed, Mill Creek, WA (US); Tony Long, Edmonds, WA (US); Mauruthi Geetha Mohan, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 145 days.

(21) Appl. No.: 18/466,447

(22) Filed: Sep. 13, 2023

(65) Prior Publication Data
US 2025/0088514 A1    Mar. 13, 2025

(51) Int. Cl.
*H04L 9/40*    (2022.01)

(52) U.S. Cl.
CPC ........ *H04L 63/105* (2013.01); *H04L 63/0823* (2013.01)

(58) Field of Classification Search
CPC ..... H04L 63/105; H04L 63/107; H04L 63/08; H04L 63/0823
See application file for complete search history.

(56) References Cited

U.S. PATENT DOCUMENTS

| | | | |
|---|---|---|---|
| 5,699,431 A | 12/1997 | Van Oorschot et al. | |
| 7,272,714 B2* | 9/2007 | Nagaratnam | H04L 63/0823 713/157 |
| 7,644,270 B1* | 1/2010 | Cherukumudi | H04L 63/0823 713/181 |
| 8,452,958 B2 | 5/2013 | Sun et al. | |
| 9,172,543 B2 | 10/2015 | Wnuk | |

(Continued)

FOREIGN PATENT DOCUMENTS

| | | |
|---|---|---|
| CN | 112019477 A | 12/2020 |
| CN | 114884963 A | 8/2022 |

(Continued)

OTHER PUBLICATIONS

"What is Certificate Lifecycle Management", Retrieved from https://www.encryptionconsulting.com/different-phases-of-a-certificate-lifecycle-management-process/, Aug. 1, 2024, pp. 1-12.

(Continued)

*Primary Examiner* — Shanto Abedin
(74) *Attorney, Agent, or Firm* — Invoke

(57) ABSTRACT

Operations of a certificate authority (CA) service may include aggregating in a certificate repository, a plurality of sets of CA certificates, in which each set of CA certificates is issued by a particular CA that is associated with a particular trust zone and that is trusted by a particular set of network entities located in the particular trust zone. The operations may further include distributing for access by an additional set of network entities, an aggregate set of CA certificates that includes the plurality of sets of CA certificates. The additional set of network entities may utilize the plurality of sets of CA certificates to authenticate network entities located in different trust zones.

41 Claims, 10 Drawing Sheets

(56) References Cited

U.S. PATENT DOCUMENTS

| | | | |
|---|---|---|---|
| 9,197,630 | B2 | 11/2015 | Sharif et al. |
| 9,231,933 | B1 | 1/2016 | Shenoy et al. |
| 9,485,101 | B2 | 11/2016 | Bowen |
| 9,660,978 | B1 | 5/2017 | Truskovsky et al. |
| 9,680,813 | B2 | 6/2017 | Sade et al. |
| 9,794,249 | B1 | 10/2017 | Truskovsky et al. |
| 9,882,727 | B1 | 1/2018 | Veladanda et al. |
| 10,021,084 | B2 | 7/2018 | Matthews et al. |
| 10,212,147 | B2 | 2/2019 | Buendgen et al. |
| 10,652,030 | B1 | 5/2020 | Levy et al. |
| 10,764,263 | B2 | 9/2020 | Rossi |
| 10,771,261 | B1 | 9/2020 | Lazar et al. |
| 10,812,276 | B2 | 10/2020 | Bojjireddy et al. |
| 10,848,323 | B2 | 11/2020 | Barr, III et al. |
| 11,153,103 | B2 | 10/2021 | Fynaardt et al. |
| 11,196,570 | B2 | 12/2021 | Borne-Pons et al. |
| 11,310,059 | B2 | 4/2022 | Leibmann et al. |
| 11,362,843 | B1 | 6/2022 | Jiang et al. |
| 11,368,314 | B2 | 6/2022 | Ray et al. |
| 11,388,594 | B2 * | 7/2022 | Uy .................. H04L 9/0844 |
| 11,438,325 | B2 * | 9/2022 | Begun ................ G06F 9/45558 |
| 11,627,123 | B2 | 4/2023 | Stayskal et al. |
| 11,706,038 | B1 * | 7/2023 | Thakore ................ H04L 9/006 713/153 |
| 11,888,997 | B1 | 1/2024 | Bowen et al. |
| 12,088,738 | B2 * | 9/2024 | Rosenthol ............... H04L 9/321 |
| 2002/0007346 | A1 * | 1/2002 | Qiu ....................... H04L 63/126 705/50 |
| 2002/0174066 | A1 | 11/2002 | Kleckner et al. |
| 2003/0037234 | A1 | 2/2003 | Fu et al. |
| 2006/0047965 | A1 | 3/2006 | Thayer |
| 2006/0101510 | A1 | 5/2006 | Kadyk et al. |
| 2007/0005956 | A1 | 1/2007 | Zilinskas et al. |
| 2007/0147619 | A1 | 6/2007 | Bellows et al. |
| 2010/0030897 | A1 | 2/2010 | Stradling |
| 2010/0325429 | A1 | 12/2010 | Saha et al. |
| 2011/0113239 | A1 | 5/2011 | Fu et al. |
| 2012/0036220 | A1 | 2/2012 | Dare et al. |
| 2012/0246466 | A1 | 9/2012 | Salvarani et al. |
| 2014/0298419 | A1 * | 10/2014 | Boubez ................... H04L 63/08 726/4 |
| 2015/0135299 | A1 | 5/2015 | Liang et al. |
| 2017/0039373 | A1 | 2/2017 | Sasin et al. |
| 2017/0126667 | A1 | 5/2017 | Bishop et al. |
| 2017/0171191 | A1 | 6/2017 | Cignetti et al. |
| 2017/0317837 | A1 | 11/2017 | Alrawais et al. |
| 2017/0338967 | A1 | 11/2017 | Lewison et al. |
| 2018/0083966 | A1 | 3/2018 | Zhou et al. |
| 2018/0102904 | A1 | 4/2018 | Lin et al. |
| 2018/0287804 | A1 | 10/2018 | Geisbush |
| 2019/0149342 | A1 | 5/2019 | Fynaardt et al. |
| 2019/0165950 | A1 | 5/2019 | Ibrahim |
| 2019/0347406 | A1 | 11/2019 | Lev-Ran |
| 2019/0349402 | A1 | 11/2019 | Shukla et al. |
| 2019/0363895 | A1 | 11/2019 | Barr et al. |
| 2020/0021575 | A1 | 1/2020 | Rezvani et al. |
| 2020/0092095 | A1 | 3/2020 | Yang et al. |
| 2020/0150972 | A1 | 5/2020 | Ketkar et al. |
| 2020/0274718 | A1 * | 8/2020 | Hwang ................. H04L 9/3239 |
| 2020/0274862 | A1 | 8/2020 | Varvarezis et al. |
| 2021/0034767 | A1 | 2/2021 | Free et al. |
| 2021/0126801 | A1 | 4/2021 | Nix |
| 2021/0152547 | A1 | 5/2021 | Barhudarian et al. |
| 2021/0211307 | A1 | 7/2021 | Statia et al. |
| 2021/0218723 | A1 | 7/2021 | Lekov et al. |
| 2021/0392002 | A1 | 12/2021 | Gray et al. |
| 2021/0409403 | A1 | 12/2021 | Lewin et al. |
| 2021/0409409 | A1 | 12/2021 | Palanisamy |
| 2022/0038894 | A1 | 2/2022 | Yoon et al. |
| 2022/0123951 | A1 | 4/2022 | Lutz et al. |
| 2022/0150238 | A1 | 5/2022 | Bhalerao |
| 2022/0239503 | A1 | 7/2022 | Mallikarjuna et al. |
| 2022/0393886 | A1 | 12/2022 | Williams et al. |
| 2023/0032867 | A1 | 2/2023 | Peddada et al. |
| 2023/0109231 | A1 | 4/2023 | Adogla et al. |
| 2023/0208655 | A1 | 6/2023 | Statia et al. |
| 2023/0237155 | A1 | 7/2023 | Jacquin et al. |
| 2023/0291577 | A1 | 9/2023 | Thai et al. |
| 2023/0401307 | A1 | 12/2023 | Pop et al. |
| 2023/0412397 | A1 | 12/2023 | Gollent et al. |
| 2024/0015508 | A1 | 1/2024 | Yoon et al. |
| 2024/0020373 | A1 | 1/2024 | Ivanov et al. |
| 2024/0031146 | A1 | 1/2024 | Marosi-Bauer et al. |
| 2024/0106886 | A1 | 3/2024 | Roy et al. |
| 2024/0121603 | A1 | 4/2024 | Yoon et al. |
| 2024/0146543 | A1 * | 5/2024 | Sahoo .................. H04L 9/3271 |
| 2024/0333640 | A1 | 10/2024 | Shevade et al. |
| 2024/0356763 | A1 | 10/2024 | Goldberg et al. |
| 2024/0388510 | A1 | 11/2024 | Madtha et al. |
| 2025/0030561 | A1 | 1/2025 | Long et al. |
| 2025/0088373 | A1 | 3/2025 | Uzun et al. |
| 2025/0097211 | A1 | 3/2025 | Uzun et al. |
| 2025/0133401 | A1 | 4/2025 | Lee et al. |

FOREIGN PATENT DOCUMENTS

| | | |
|---|---|---|
| EP | 1251670 A2 | 10/2002 |
| EP | 2267970 A2 | 12/2010 |
| EP | 2854349 A1 | 4/2015 |
| EP | 3772208 B1 | 9/2024 |
| KR | 10-2011-0045459 A | 5/2011 |
| WO | 2006/122024 A2 | 11/2006 |
| WO | 2022/121461 A1 | 6/2022 |
| WO | 2022/133026 A1 | 6/2022 |
| WO | 2023/240360 A1 | 12/2023 |
| WO | 2025/059187 A1 | 3/2025 |

OTHER PUBLICATIONS

"About Azure Key Vault certificates", Retrieved from https://learn.microsoft.com/en-us/azure/key-vault/certificates/about-certificates, Feb. 8, 2023, pp. 1-8.

"About the Expressway", Aug. 17, 2022. pp. 1-12.

"Automated certificate management for TLS certificates", Retrieved from https://docs.servicenow.com/en-us/bundle/utah-it-operations-management/page/product/discovery/concept/automated-cert-requests.html, Retrieved on May 4, 2023, pp. 1-4.

"AWS Certificate Manager FAQs", Retrieved from https://aws.amazon.com/certificate-manager/faqs/, Retrieved on Mar. 24, 2023, pp. 1-17.

"Azure Instance Metadata Service", Retrieved from https://learn.microsoft.com/en-us/azure/virtual-machines/instance-metadata-service?tabs=windows, Mar. 15, 2023, pp. 1-42.

"Cisco Expressway Certificate Creation and Use Deployment Guide", Feb. 23, 2021, pp. 10.

"Deploying the CA bundle iApp", Retrieved from https://www.f5.com/pdf/deployment-guides/f5-ca-bundle-dg.pdf, Dec. 14, 2017, pp. 1-9.

"DigiCert Public Key Infrastructure (PKI) Platform", 2019, pp. 15.

"Get started with Key Vault certificates", Retrieved from https://learn.microsoft.com/en-us/azure/key-vault/certificates/certificate-scenarios, Retrieved on Feb. 1, 2023, pp. 1-6.

"High Availability using Patching and Rolling AP Upgrade on Cisco Catalyst 9800 Wireless Controllers", Copyright 2020, pp. 1-41.

"Manage Certificate Revocation Lists (CRLs)", Jul. 23, 2021, pp. 1-4.

"PKI secrets engine", Retrieved from https://developer.hashicorp.com/vault/docs/secrets/pki, Retrieved on May 4, 2023, pp. 1-3.

"Planning a certificate revocation list (CRL)", Retrieved from https://docs.aws.amazon.com/privateca/latest/userguide/crl-planning.html, Retrieved on Jul. 28, 2023, pp. 11.

"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.

"Release Your App Update in a Staged Rollout", Retrieved from https://developer.amazon.com/docs/app-submission/release-updates-in-staged-rollouts.html, Retrieved on Apr. 27, 2023, pp. 1-18.

(56) References Cited

OTHER PUBLICATIONS

"Rotate Security Certificates", Retrieved from https://www.cockroachlabs.com/docs/stable/rotate-certificates, Retrieved on May 4, 2023, pp. 1-6.

"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.

"Staged upgrade", Retrieved from https://www.ibm.com/docs/en/order-management-sw/9.4.0?topic=migrating-staged-upgrade, Mar. 2, 2021, pp. 1-3.

"Troubleshoot SSL certificates", Retrieved from https://cloud.google.com/load-balancing/docs/ssl-certificates/troubleshooting, Retrieved on Mar. 24, 2023, pp. 1-8.

"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.

"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.

"Updating your private CA", Retrieved from https://docs.aws.amazon.com/privateca/latest/userguide/PCAUpdateCA.html, Retrieved on Mar. 24, 2023, pp. 1-4.

"Use self-managed SSL certificates", Retrieved from https://cloud.google.com/load-balancing/docs/ssl-certificates/self-managed-certs, Aug. 15, 2023, pp. 13.

"VSphere Security", vmware, Update 3, Mar. 21, 2023, pp. 1-426.

"Working with Hosts", Retrieved from https://docs.cloudstack.apache.org/projects/archived-cloudstack-administration/en/latest/hosts.html, Retrieved on Mar. 24, 2023, pp. 1-7.

Atutxa et al., "Improving efficiency and security of IIoT communications using in-network validation of server certificate", Computers in Industry, vol. 144, Jan. 2023, 103802, pp. 30.

Bigelow S.J., "Rolling deployment", Retrieved from https://www.techtarget.com/searchitoperations/definition/rolling-deployment, Jan. 2023, pp. 4.

Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.

Ghanmi et al., "A Secure Data Storage in Multi-cloud Architecture Using Blowfish Encryption Algorithm", Advanced Information Networking and Applications, Mar. 2022, pp. 398-408.

Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.

Manjusha R. et al., "Secure Authentication and Access System for Cloud Computing Auditing Services Using Associated Digital Certificate", Indian Journal of Science and Technology, vol. 8 (S7), Apr. 2015, pp. 220-227.

Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, pp. 10.

Rowley J., "Google's Moving Forward Together Proposals for Root CA Policy: Rotating ICAS More Frequently", Retrieved from https://www.digicert.com/blog/googles-moving-forward-together-proposals-for-root-ca-policy, Mar. 22, 2023, pp. 1-11.

Subhayu, "Different Phases of a Certificate Lifecycle Management Process for a secure WPA2-Enterprise network", Certificate Lifecycle Management Oct. 6, 2022, pp. 16.

Ylonen et al., "Security of Automated Access Management Using Secure Shell (SSH)", NISTIR 7966 (Draft), Aug. 2014, pp. 43.

\* cited by examiner

AGGREGATING CERTIFICATE AUTHORITY CERTIFICATES FOR AUTHENTICATING NETWORK ENTITIES LOCATED IN DIFFERENT TRUST ZONES

TECHNICAL FIELD

The present disclosure relates to certificate authority (CA) certificates utilized to authenticate entity certificates presented by network entities. More particularly, the present disclosure relates to authentication of network entities located in different trust zones.

BACKGROUND

A computing network, such as a virtual cloud network, includes network entities that communicate with one another. Communications between network entities may be performed in accordance with a security protocol whereby network entities authenticate one another by presenting a digital certificate. When a network entity presents a valid digital certificate to another network entity, the other network entity can trust that it is communicating with the network entity, as opposed to some unknown entity, based on a trust relationship with the CA that issued the digital certificate. A digital certificate may be issued to a network entity by a CA. The digital certificate may include a digital signature generated using a private key of the CA that issued the digital certificate. The digital signature can be validated using a CA certificate of the CA that includes a public key corresponding to the private key.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
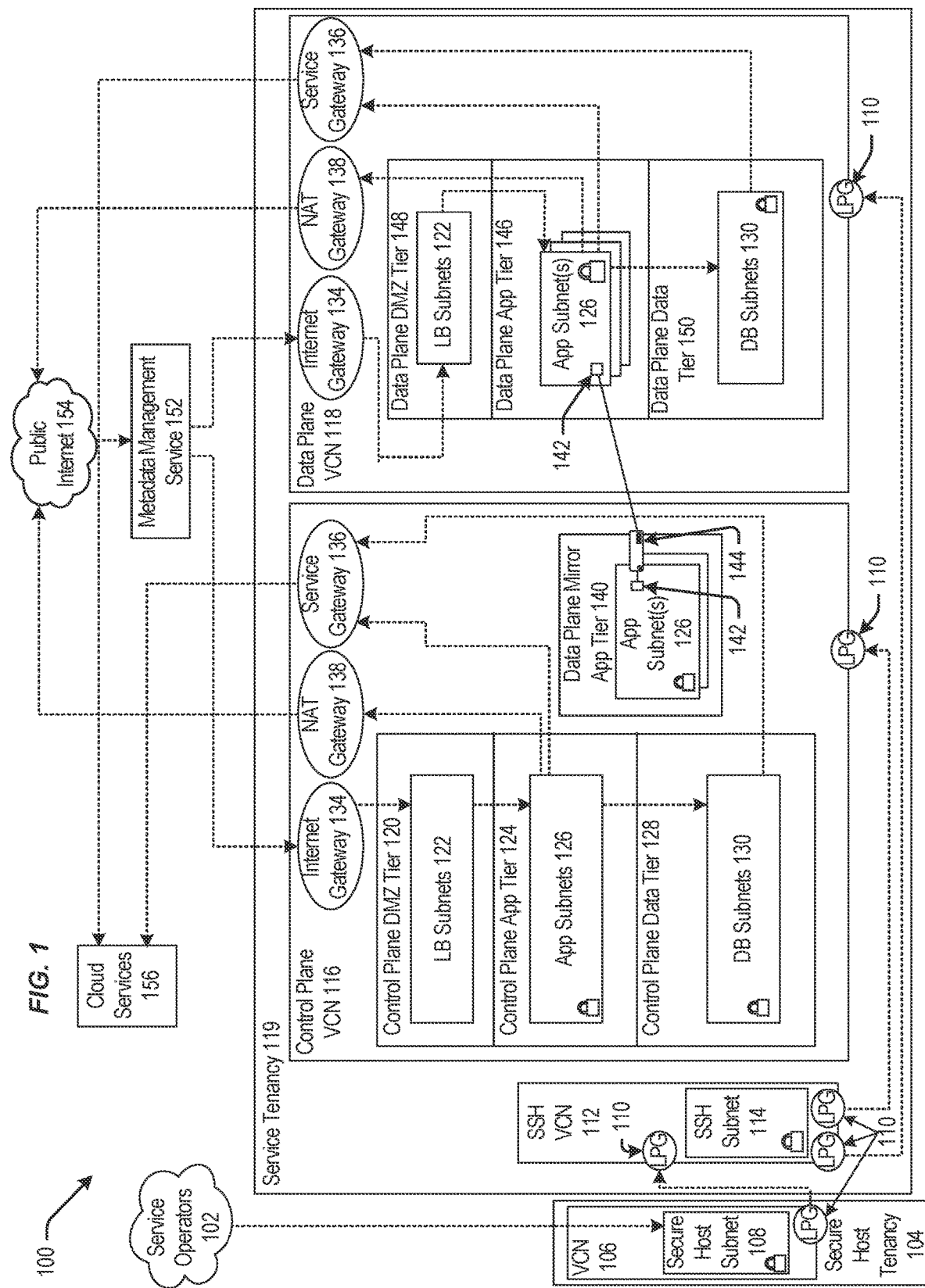
FIGS. 1-4 are block diagrams illustrating patterns for implementing a cloud infrastructure as a service system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
1. GENERAL OVERVIEW
2. CLOUD COMPUTING TECHNOLOGY
3. COMPUTER SYSTEM
4. ARCHITECTURAL OVERVIEW
5. AGGREGATING CERTIFICATE AUTHORITY CERTIFICATES
6. AUTHENTICATING NETWORK ENTITIES
7. MISCELLANEOUS; EXTENSIONS

1. General Overview

One or more embodiments aggregate and distribute certificate authority (CA) certificates, associated with a plurality of CAs in different trust zones, for enabling a system to authenticate entity certificates issued by different respective CAs in different trust zones. A system may receive a first set of CA certificates from a first CA service located in a first trust zone associated with a first CA that is trusted by a first set of network entities, and a second set of CA certificates from a second CA service located in a second trust zone associated with a second CA that is trusted by a second set of network entities. The system may aggregate the first set of CA certificates and the second set of CA certificates and may distributing for access by a third set of network entities, an aggregate set of CA certificates that includes the first set of CA certificates and the second set of CA certificates. The third set of network entities may use the first set of CA certificates to establish trust with the first CA and to authenticate a first set of entity certificates issued by the first CA to the first set of network entities. Additionally, the third set of network entities may use the second set of CA certificates to establish trust with the second CA and to authenticate a second set of entity certificates issued by the second CA to the second set of network entities.

In one example, the system may aggregate CA certificates for use by an interzone CA service. The interzone CA service may use the aggregate set of CA certificates to authenticate network entities in connection with initially provisioning and/or updating interzone network entities that may communicate across trust zone boundaries, such as with other network entities located outside of a particular trust zone. A particular trust zone may encompass all or a portion of a virtual cloud network. Additionally, or in the alternative, a particular trust zone may encompass a plurality of virtual cloud networks. In one example, the system may aggregate CA certificates from different CAs associated with trust zones for use with respect to network entities that engage in communications across trust zone boundaries. The network entities may use the aggregate set of CA certificates to authenticate network entities located in different trust zones, as well as network entities located within the same trust zone. By distributing an aggregate set of CA certificates, the respective network entities have access to all of the CA certificates that are needed for initially provisioning and/or updating interzone network entities, as well as the CA certificates that are needed to establish trust with CAs associated with different trust zones and to authenticate network entities located in different trust zones.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
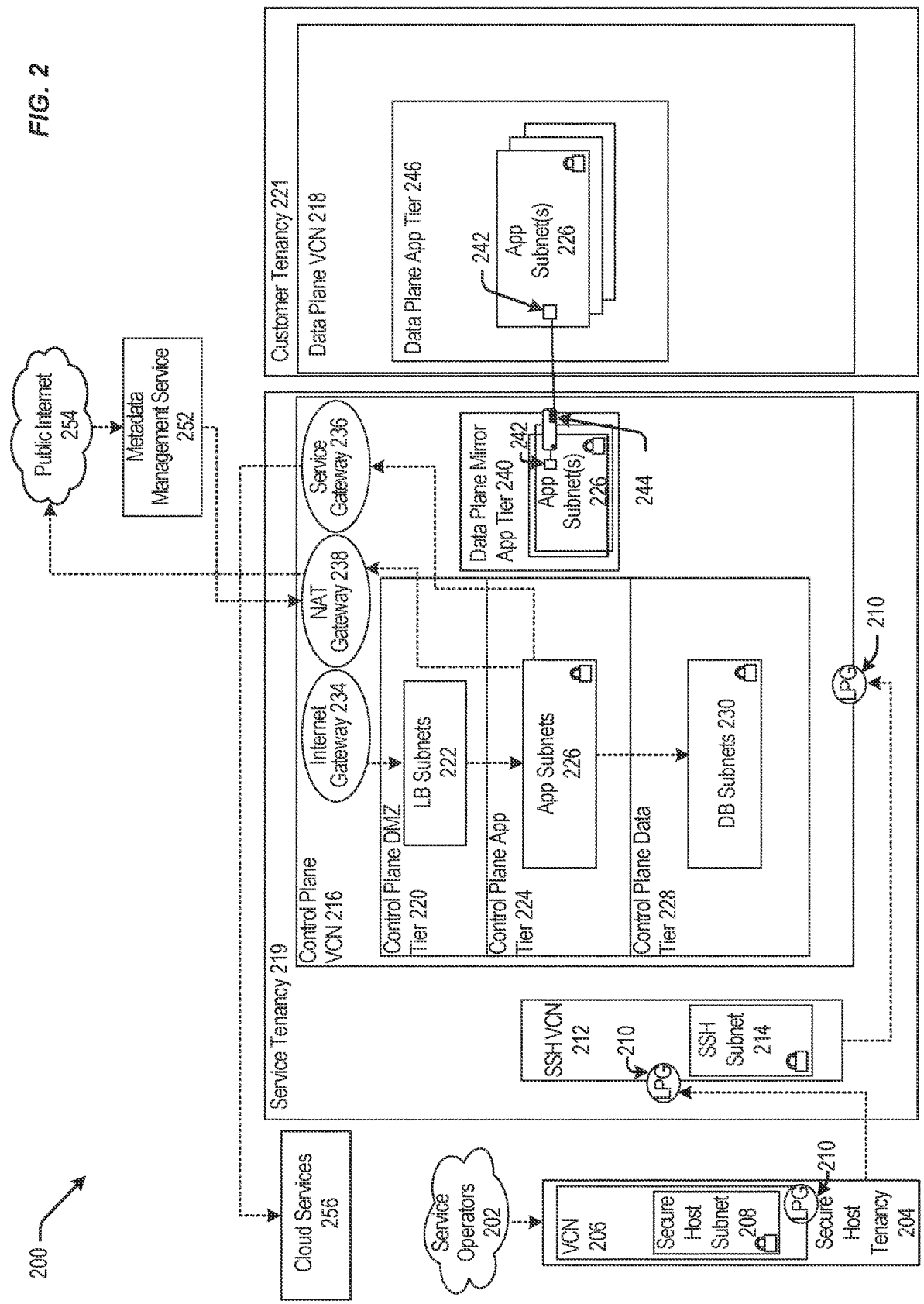

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG. 1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
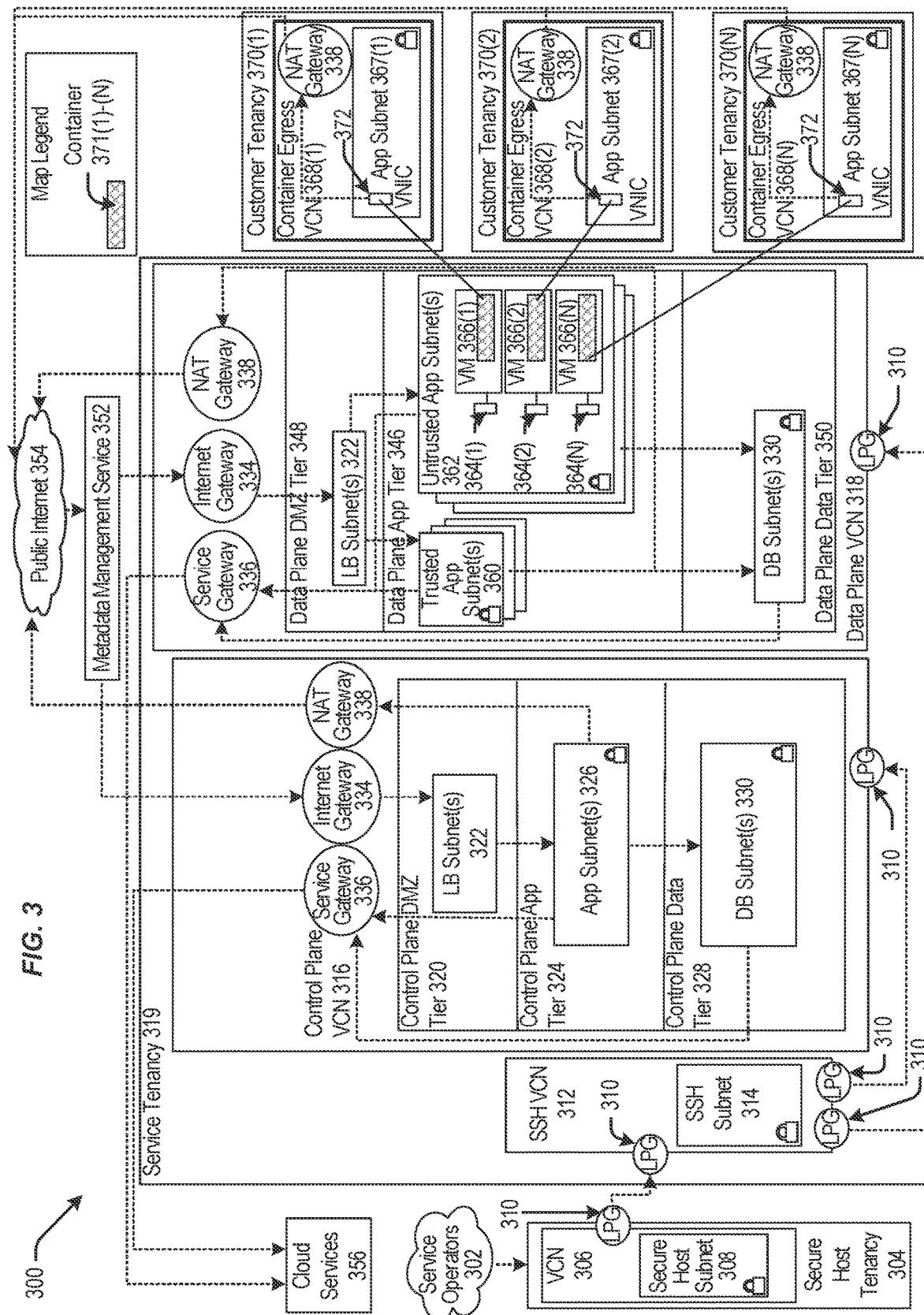

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324 (e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
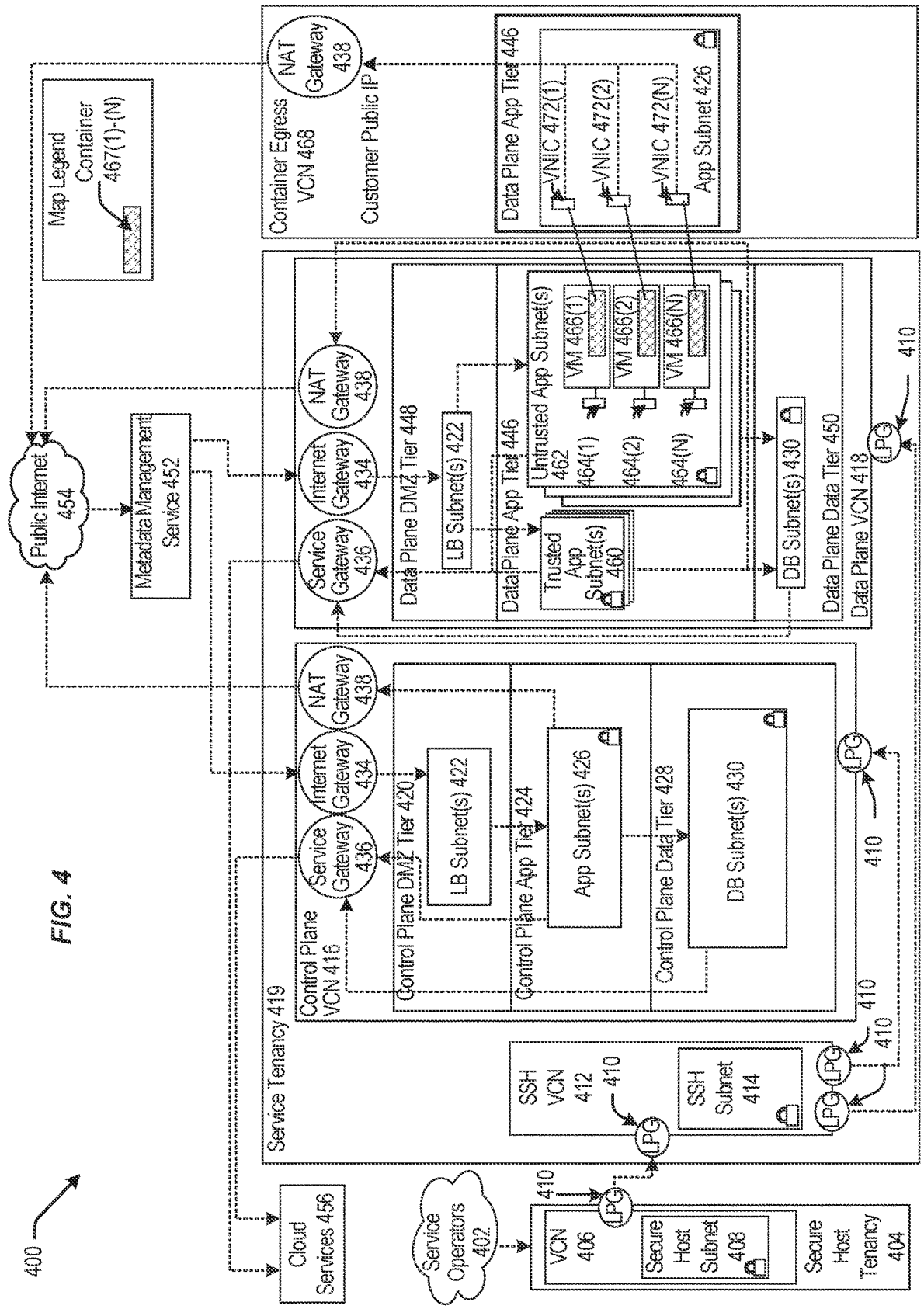

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assigned.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
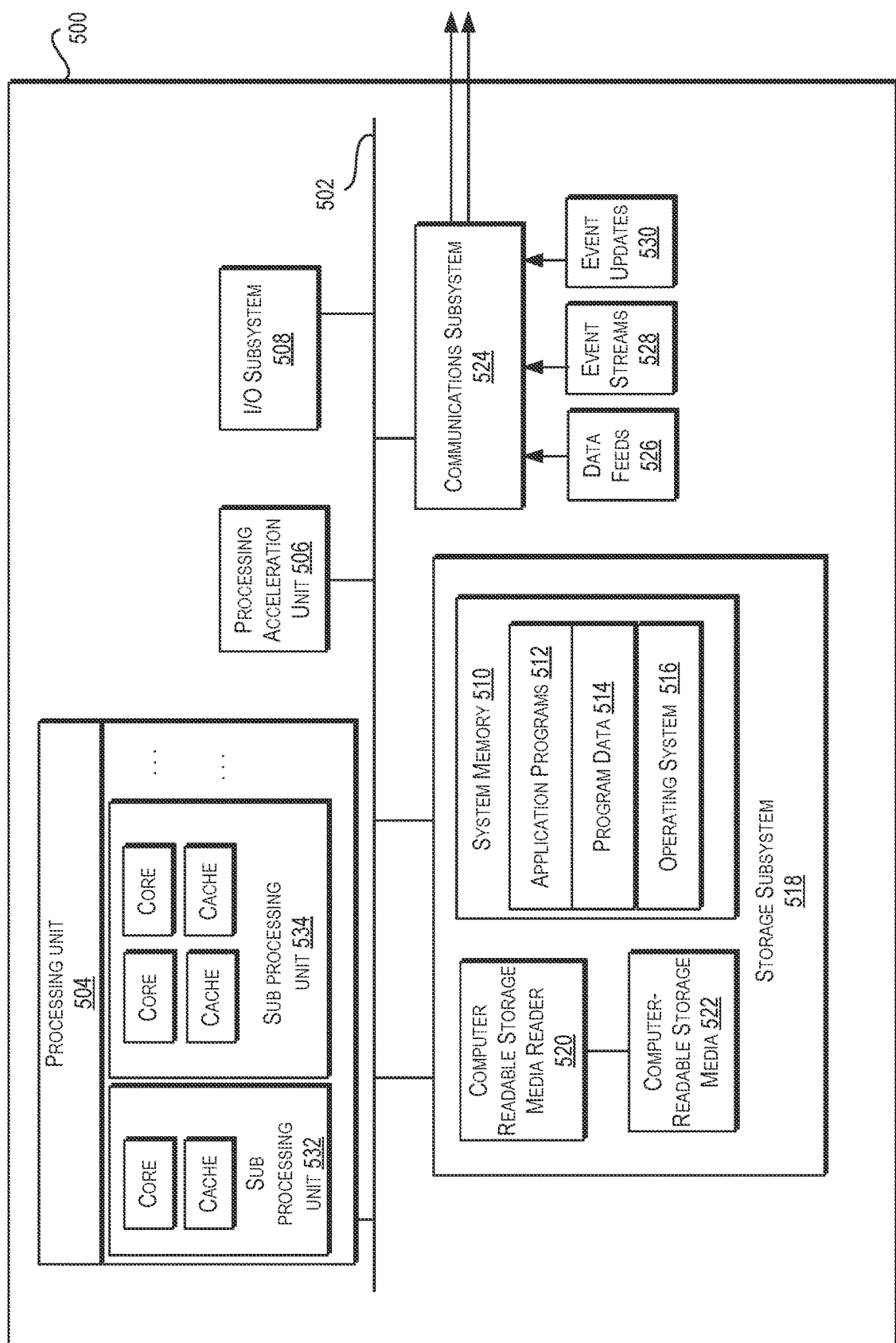
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular axe 26 telephone technology, advanced data network technology, such as 3G, 4G or EDGE (enhanced data rates for global evolution), WiFi (IEEE 702.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Architectural Overview

FIGS. 6A-6D illustrate one example of a system 600 in accordance with one or more embodiments. The system 600 described with reference to FIGS. 6A-6D may include architecture that performs operations associated with aggregating CA certificates as described herein, distributing aggregate sets of CA certificates, and/or utilizing the CA certificates to authenticate entity certificates, as respectively described herein. The system 600 may also perform operations associated with distributing certificate bundles that include sets of CA certificates to network entities as described herein. Example CA certificates and example entity certificates are further described below in Section 6, "Authenticating Network Entities."

A. Trust Zone Architecture.

Figure 6A:
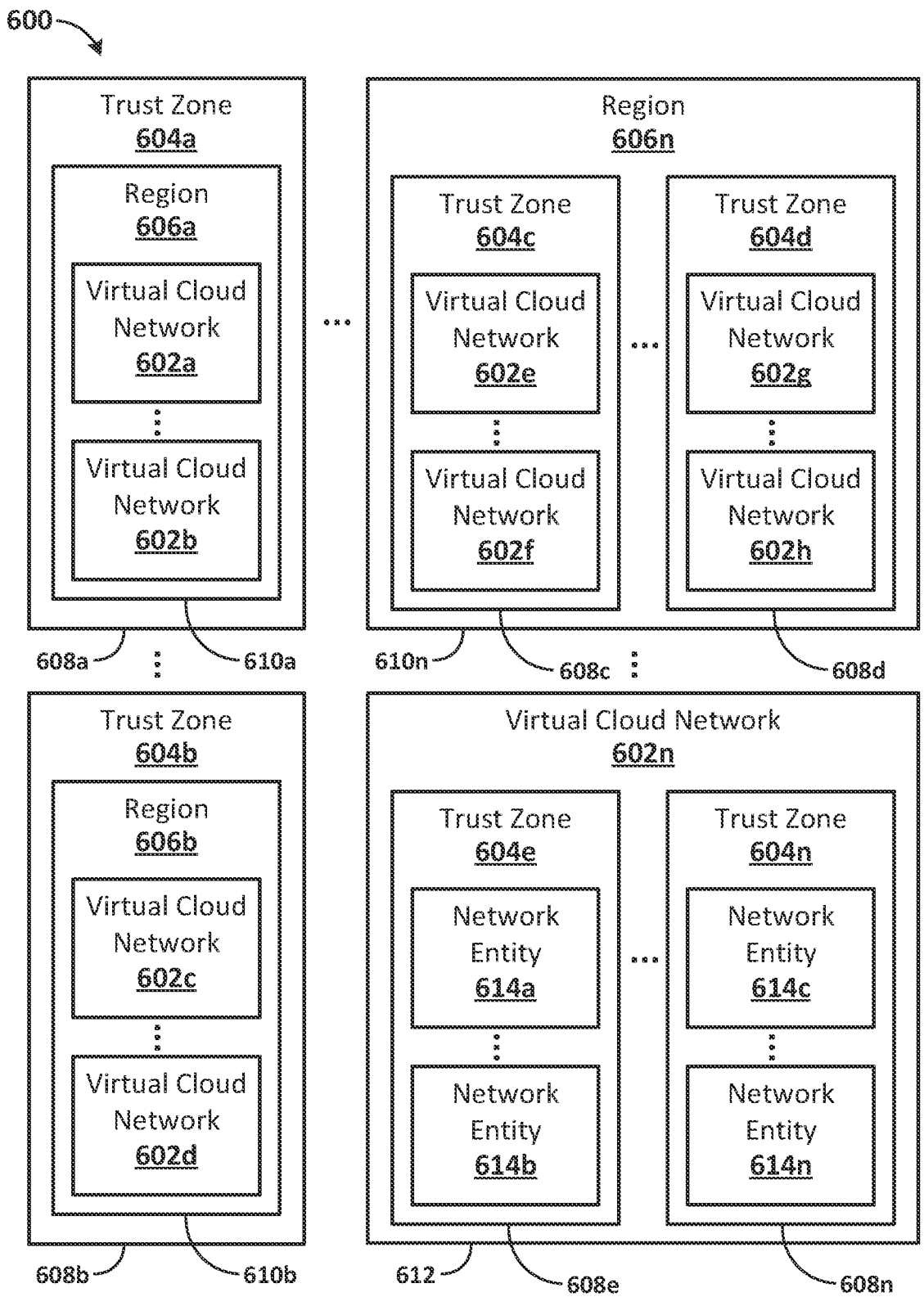
FIGS. 6A-6D illustrate features of an example system in accordance with one or more embodiments.

As illustrated in FIG. 6A, the system 600 may include one or more virtual cloud networks 602, and a plurality of trust zones 604 that respectively include all or a portion of the one or more virtual cloud networks 602. In one example, the system 600 may include one or more regions 606. The one or more regions 606 may respectively include one or more trust zones 604. A trust zone may be delineated by a trust zone boundary 608.

As used herein, the term "trust zone" refers to a portion of a cloud computing environment within which a particular CA issues entity certificates to network entities. The particular CA associated with a trust zone is trusted by the network entities located in the trust zone based on the network entities having access to a CA certificate of the particular CA that may be used to authenticate the particular CA. The particular CA may be untrusted by network entities located outside the trust zone as a result of those network entities lacking the CA certificate necessary to authenticate the particular CA. A cloud computing environment may include a plurality of trust zones. A trust zone may correspond to a region. In one example, a regional CA may issue entity certificates to network entities within the region. Additionally, or in the alternative, a trust zone may correspond to a virtual cloud network. In one example, a network CA may issue entity certificates to network entities located in the virtual cloud network. Additionally, or in the alternative, a trust zone may correspond to an availability domain. In one example, a domain CA may issue entity certificates to network entities within the availability domain. Additionally, or in the alternative, a trust zone may correspond to a fault domain. In one example, a domain CA may issue entity certificates to network entities within the fault domain.

As used herein, the term "trust zone boundary" refers to a logical or physical boundary that defines a boundary of a trust zone. In one example, a trust zone boundary may correspond to a boundary of a region. In one example, a trust zone boundary may correspond to a boundary of virtual cloud network. In one example, a trust zone boundary may correspond to a boundary of an availability domain. In one example, a trust zone boundary may correspond to a boundary of a fault domain.

As used herein, the term "region" refers to a set of one or more interconnected data centers upon which one or more virtual cloud networks may be deployed. In one example, a region may correspond to a physical geographic area. In one example, a region may correspond to multiple physical geographic areas and/or a portion of a physical geographic area.

In one example, a trust zone boundary 608 may correspond to a region boundary 610. As used herein, the term "region boundary" refers to a logical or physical boundary that defines a boundary of a region. As shown in FIG. 6A, trust zone 604a, delineated by trust zone boundary 608a, may correspond to and/or encompass region 606a, delineated by region boundary 610a. Region 606a may include one or more virtual cloud networks 602, such as virtual cloud network 602a and virtual cloud network 602b. As further shown, trust zone 604b, delineated by trust zone boundary 608b, may correspond to and/or encompass region 606b, delineated by region boundary 610b. Region 606b may include one or more virtual cloud networks 602, such as virtual cloud network 602c and virtual cloud network 602d.

In one example, a region 606 may include one or more trust zones 604. A region boundary 610, delineating a region 606, may encompass the one or more trust zones 604. For example, as shown in FIG. 6A, region 606n, delineated by region boundary 610n, may include trust zone 604c (delineated by trust zone boundary 608c) and trust zone 604d (delineated by trust zone boundary 608d). Trust zone 604c may include one or more virtual cloud networks 602, such as virtual cloud network 602e and virtual cloud network 602f. The one or more virtual cloud networks 602, such as virtual cloud network 602e and/or virtual cloud network 602f, may be encompassed by the trust zone boundary 608c. Trust zone 604d may include one or more virtual cloud networks 602, such as virtual cloud network 602g and virtual cloud network 602h. The one or more virtual cloud networks 602, such as virtual cloud network 602g and/or virtual cloud network 602h, may be encompassed by the trust zone boundary 608d.

In one example, a virtual cloud network 602 may include one or more trust zones 604. A virtual cloud network boundary 612, delineating a virtual cloud network 602, may encompass the one or more trust zones 604. As used herein, the term "virtual cloud network boundary" or "VCN boundary" refers to a logical or physical boundary that defines a boundary of a virtual cloud network.

As shown in FIG. 6A, virtual cloud network 602n, delineated by virtual cloud network boundary 612, may include trust zone 604e (delineated by trust zone boundary 608e) and trust zone 604n (delineated by trust zone boundary 608n). Trust zone 604e may include one or more network entities 614, such as network entity 614a and network entity 614b. The one or more network entities 614, such as network entity 614a and/or network entity 614b, may be encompassed by the trust zone boundary 608c. Trust zone 604n may include one or more network entities 614, such as network entity 614c and network entity 614n. The one or more network entities 614, such as network entity 614c and/or network entity 614n, may be encompassed by the trust zone boundary 608n.

In one example, a trust zone 604 that encompasses a portion of a virtual cloud network 602 may include one or more network entities 614 that share an availability domain. The trust zone boundary 608 may corresponding to a boundary of the availability domain. As used herein, the term "availability domain" refers to a physically separate portion of a virtual cloud network with respect to one or more failure modes.

In one example, a trust zone 604 that encompasses a portion of a virtual cloud network 602 may include one or more network entities 614 that share a fault domain. The trust zone boundary 608 may corresponding to a boundary of the fault domain. As used herein, the term "fault domain" refers to a portion of a virtual cloud network that has a single point of failure.

B. Certificate Authority Services.

Figure 6B:
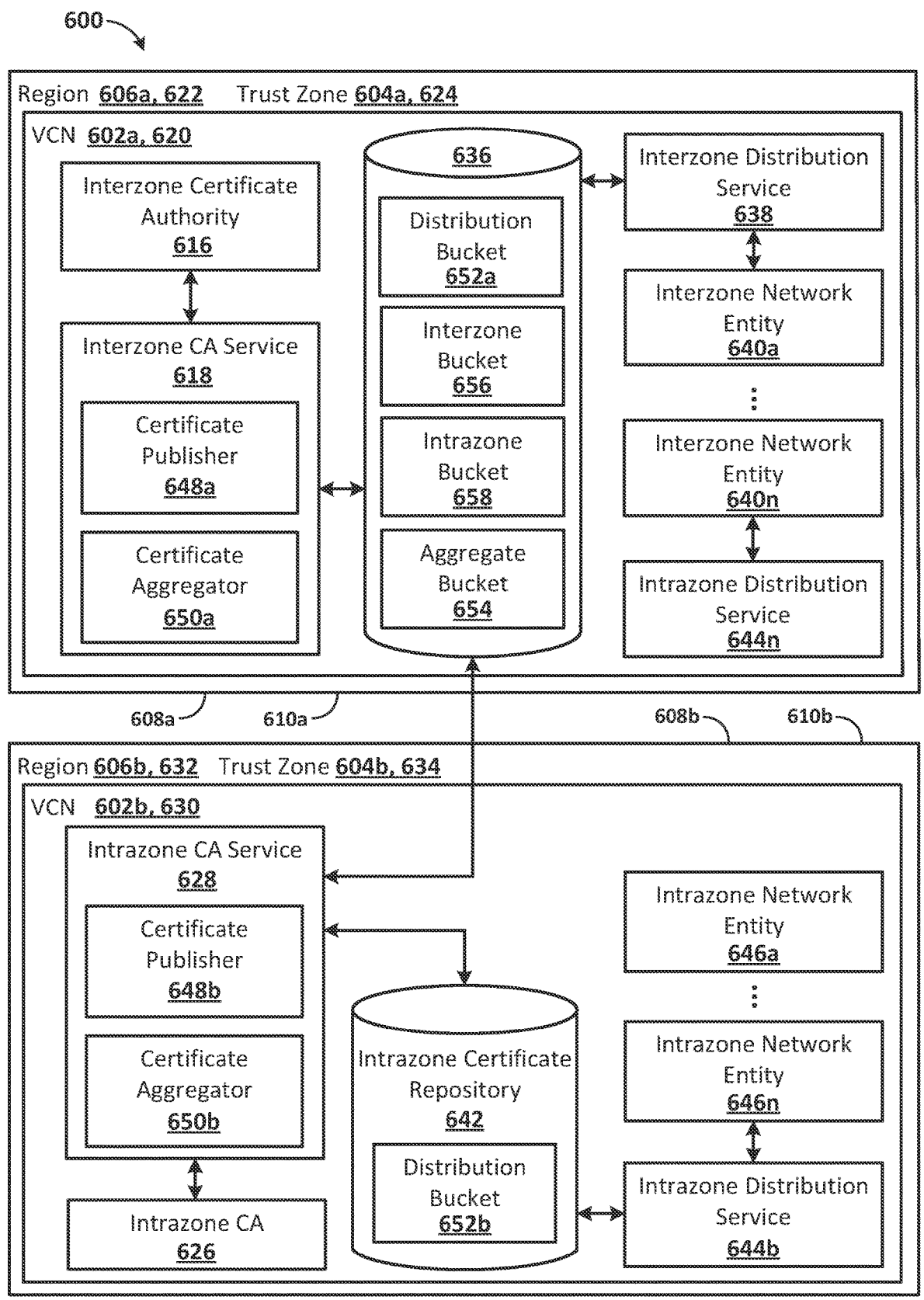

Referring now to FIG. 6B, architecture and operations associated with aggregating CA certificates are further described. As shown in FIG. 6B, the system 600 may include an interzone CA 616 and an interzone CA service 618. The interzone CA 616 and/or the interzone CA service 618 may be located on a virtual cloud network 602, such as virtual cloud network 602a. The system 600 may include at least one virtual cloud network 602 that has an interzone CA 616 and an interzone CA service 618. In one example, the interzone CA 616 and the interzone CA service 618 may be located on a home VCN 620. For example, virtual cloud network 602a may be a home VCN 620. The home VCN 620 may be located in a home region 622. For example, region 606a may be a home region 622. A trust zone 604, such as trust zone 604a, may encompass the home VCN 620. A trust zone 604, such as trust zone 604a, that encompasses a home VCN 620 may be referred to as a home trust zone 624. The trust zone 604a may have a trust zone boundary 608a that corresponds to region boundary 610a of region 606a.

As further shown in FIG. 6B, the system 600 may include an intrazone CA 626 and an intrazone CA service 628. The intrazone CA 626 and/or the intrazone CA service 628 may be located on a virtual cloud network 602, such as virtual cloud network 602b. The system 600 may include one or more virtual cloud networks 602 that have an intrazone CA 626 and an intrazone CA service 628. In one example, an intrazone CA 626 and an intrazone CA service 628 may be located on each virtual cloud network 602, such as virtual cloud network 602a and virtual cloud network 602b. In one example, an intrazone CA 626 and an intrazone CA service 628 may be located on an ancillary VCN 630. For example, virtual cloud network 602b may be an ancillary VCN 630. The ancillary VCN 630 may be located in an ancillary region 632. For example, region 606b may be an ancillary region 632. A trust zone 604, such as trust zone 604b, may encompass the ancillary VCN 630. A trust zone 604, such as trust zone 604b, that encompasses an ancillary VCN 630 may be referred to as an ancillary trust zone 634. The trust zone 604b may have a trust zone boundary 608b that corresponds to region boundary 610b of region 606b.

As used herein, the term "home region" refers to a region of a cloud computing environment from which a virtual cloud infrastructure is deployed and/or managed. In one example, a home region may deploy and/or manage virtual cloud infrastructure associated with an interzone CA 616 and/or interzone CA services 618.

As used herein, the term "home VCN" refers to a virtual cloud network 602 within a home region. In one example, virtual cloud infrastructure may be deployed and/or managed from a home VCN. For example, an interzone CA 616 and/or interzone CA services 618 may be deployed and/or managed from a home VCN. A home region 622 and/or a home VCN 620 may serve as an initial location for deploying cloud computing resources and services, such as ancillary regions 632 and/or ancillary virtual cloud networks 630.

As used herein, the term "ancillary region" refers to a region of a cloud computing environment that utilizes and/or relies on a home region and/or a home VCN for deployment and/or management of at least a portion of a virtual cloud infrastructure with respect to one or more virtual cloud networks within the region. In one example, an ancillary region may rely on a home region and/or a home VCN for deployment and/or management of an interzone CA 616 and/or interzone CA services 618.

As used herein, the term "ancillary VCN" refers to a virtual cloud network 602 that is not a home VCN. An ancillary VCN may be located in an ancillary region 632 or a home region 622. In one example, an ancillary VCN 630 may utilize and/or rely on a home VCN 620 and/or a home region 622 for deployment and/or management of at least a portion of a virtual cloud infrastructure, such as deployment and/or management of an interzone CA 616 and/or interzone CA services 618.

Referring further to FIG. 6B, an interzone CA 616 may issue digital certificates for use with respect to interzone security protocols, such as for authentication of network entities from different trust zones. The digital certificates issued by the interzone CA 616 may include CA certificates and/or entity certificates. A CA certificate issued by an interzone CA 616 may be referred to herein as an interzone CA certificate. An entity certificate issued by an interzone CA 616 may be referred to herein as an interzone entity certificate. An interzone CA certificate may be used to authenticate an interzone entity certificate. The interzone CA 616 may issue interzone entity certificates to network entities that communicate and/or exchange data with network entities from one or more different trust zones. An interzone CA service 618 may perform operations associated with the interzone CA 616 as described herein.

An intrazone CA 626 may issue digital certificates for use with respect to intrazone security protocols, such as for authentication of network entities within a trust zone corresponding to the intrazone CA 626. The digital certificates issued by the intrazone CA 626 may include CA certificates and/or entity certificates. A CA certificate issued by an intrazone CA 626 may be referred to herein as an intrazone CA certificate. An entity certificate issued by an intrazone CA 626 may be referred to herein as an intrazone entity certificate. An intrazone CA certificate may be used to authenticate an intrazone entity certificate. The intrazone CA 626 may issue intrazone entity certificates to network entities that communicate and/or exchange data with network entities within the same trust zone as one another. An intrazone CA service 628 may perform operations associated with the intrazone CA 626 as described herein.

In one example, a home VCN 620, such as virtual cloud network 602a, may include both an interzone CA 616 and an intrazone CA 626. Additionally, a home VCN 620, such as virtual cloud network 602a, may include both an interzone CA service 618 and an intrazone CA service 628. An intrazone CA 626 located on a home VCN 620 may issue digital certificates for use with respect to intrazone security protocols within a trust zone corresponding to the home VCN 620. An intrazone CA service 628 located on a home VCN 620 may perform operations associated with the intrazone CA 626 with respect to the trust zone corresponding to the home VCN 620 as described herein.

As shown in FIG. 6B with respect to virtual cloud network 602a, a virtual cloud network 602, such as a home VCN 620, may include an interzone certificate repository 636 and an interzone distribution service 638. The interzone CA service 618 may store interzone digital certificates in the interzone certificate repository 636. The interzone distribution service 638 may retrieve interzone digital certificates from the interzone certificate repository 636 and distribute the interzone digital certificates to one or more interzone network entities 640, such as interzone network entity 640a and interzone network entity 640n, located on the virtual cloud network 602a. The interzone digital certificates stored in the interzone certificate repository 636 by the interzone CA service 618 may include interzone CA certificates and/or interzone entity certificates. The interzone CA 616 may generate the interzone CA certificates and/or interzone entity certificates stored in the interzone certificate repository 636 by the interzone CA service 618. The interzone digital certificates retrieved by the interzone distribution service 638 and distributed to the one or more interzone network entities 640 may include the interzone CA certificates and/or the interzone entity certificates.

As shown in FIG. 6B with respect to virtual cloud network 602b, a virtual cloud network 602, such as an ancillary VCN 630, may include an intrazone certificate repository 642 and an intrazone distribution service 644 (e.g., intrazone distribution service 644b). The intrazone CA service 628 may store intrazone digital certificates in the intrazone certificate repository 642. The intrazone distribution service 644b may retrieve intrazone digital certificates from the intrazone certificate repository 642 and distribute the intrazone digital certificates to one or more intrazone network entities 646, such as intrazone network entity 646a and intrazone network entity 646n, located on the virtual cloud network 602b. The intrazone digital certificates stored in the intrazone certificate repository 642 by the intrazone CA service 628 may include intrazone CA certificates and/or intrazone entity certificates. The intrazone CA 626 may generate the intrazone CA certificates and/or intrazone entity certificates stored in the intrazone certificate repository 642 by the intrazone CA service 628. The intrazone digital certificates retrieved by the intrazone distribution service 644b and distributed to the one or more intrazone network entities 646 may include the intrazone CA certificates and/or the intrazone entity certificates.

In one example, as shown in FIG. 6B with respect to virtual cloud network 602a, a virtual cloud network 602, such as a home VCN 620, may include an intrazone distribution service 644, such as intrazone distribution service 644n. The virtual cloud network 602a, such as home VCN 620, may include the intrazone distribution service 644n in addition, or in the alternative, to the interzone distribution service 638. Additionally, virtual cloud network 602a, such as home VCN 620, may include an intrazone CA and/or an intrazone CA service. An intrazone CA associated with virtual cloud network 602a, such as home VCN 620, may generate intrazone digital certificates. The intrazone digital certificates may be distributed to network entities, such as intrazone network entities, located in virtual cloud network 602a. In one example, virtual cloud network 602a, such as home VCN 620, may include an intrazone certificate repository. An intrazone CA service associated with virtual cloud network 602a, such as home VCN 620, may store intrazone digital certificates in the intrazone certificate repository. In one example, intrazone distribution service 644n may retrieve intrazone digital certificates, such as intrazone CA certificates and/or intrazone entity certificates, from the intrazone certificate repository and distribute the intrazone digital certificates to one or more intrazone network entities located on the virtual cloud network 602a, such as home VCN 620.

A certificate repository, such as an interzone certificate repository 636 and/or an intrazone certificate repository 642, may include a storage medium or other physical hardware associated with the virtual cloud network. A certificate repository may include any type of storage unit and/or device (e.g., a file system, database, collection of tables, or any other storage mechanism) for storing data. Further, a certificate repository may include multiple different storage units and/or devices. The multiple different storage units and/or devices may or may not be of the same type or located at the same physical site. Further, a certificate repository may be implemented or executed on the same computing system as a CA service, a distribution service, and/or one or more network entities. Additionally, or in the alternative, a certificate repository may be implemented or executed on a computing system separate from a CA service, a distribution service, and/or one or more network entities. A certificate repository may be communicatively coupled to a CA service, a distribution service, and/or one or more network entities, via a direct connection or via a network.

C. Aggregating Sets of CA Certificates.

Referring further to FIG. 6B, the system 600 may include a plurality of certificate publishers 648 and a plurality of certificate aggregators 650. A certificate publisher 648 may identify a set of one or more digital certificates generated by a CA and publish the set of one or more digital certificates to a certificate repository. A certificate aggregator 650 may identify a first set of one or more digital certificates published to a certificate repository and aggregate the first set of one or more digital certificates with a second set of one or more digital certificates in a second certificate repository.

In one example, a certificate publisher 648 may be associated with one or more CAs and/or one or more CA services. A particular certificate publisher 648 may be associated with a particular CA and/or a particular CA service. Each CA and/or each CA service may have its own certificate publisher 648. As shown in FIG. 6B, certificate publisher 648a may be associated with the interzone CA 616 and/or the interzone CA service 618. As further shown, certificate publisher 648b may be associated with the intrazone CA 626 and/or the intrazone CA service 628. Additionally, or in the alternative, a particular certificate publisher 648 may be associated with a particular trust zone. Each trust zone may include one or more certificate publishers 648. As shown in FIG. 6B, certificate publisher 648a may be associated with trust zone 604a. As further shown, certificate publisher 648b may be associated with trust zone 604b.

In one example, a certificate aggregator 650 may be associated with one or more CAs and/or one or more CA services. A particular certificate aggregator 650 may be associated with a particular CA and/or a particular CA service. Each CA and/or each CA service may have its own certificate aggregator 650. As shown in FIG. 6B, certificate aggregator 650a may be associated with the interzone CA 616 and/or the interzone CA service 618. As further shown, certificate aggregator 650b may be associated with the intrazone CA 626 and/or the intrazone CA service 628. Additionally, or in the alternative, a particular certificate aggregator 650 may be associated with a particular trust zone. Each trust zone may include one or more certificate aggregators 650. As shown in FIG. 6B, certificate aggregator 650a may be associated with trust zone 604a. As further shown, certificate aggregator 650a may be associated with trust zone 604b.

i. Aggregating Sets of Intrazone CA Certificates.

Referring further to FIG. 6B, in one example, sets of CA certificates issued by CAs associated with different trust zones 604 may be aggregated in an interzone certificate repository 636. The sets of CA certificates may include intrazone CA certificates issued by intrazone CAs. The sets of CA certificates aggregated in the interzone certificate repository 636 may be distributed for access by one or more sets of network entities. The one or more sets of network entities may be respectively associated with a different trust zone.

In one example, a plurality of certificate aggregators 650 respectively associated with a particular intrazone CA 626 and/or a particular intrazone CA service 628 may obtain and/or receive a set of one or more CA certificates from a particular intrazone certificate repository 642 associated with the particular intrazone CA 626 and/or the particular intrazone CA service 628 and may transmit the set of one or more CA certificates to an interzone certificate repository 636. A certificate aggregator 650 may obtain the set of one or more CA certificates by generating a copy, or replicating, the set of one or more CA certificates. Additionally, or in the alternative, the certificate aggregator 650 may receive a copy, or a replication, of the set of one or more CA certificates, generated, for example, by a certificate publisher 648. The set of one or more CA certificates obtained from a particular intrazone certificate repository 642 may have been issued by the particular intrazone CA 626 associated with the particular certificate aggregator 650. The plurality of certificate publishers 648 may be respectively associated with a particular trust zone 604. Each particular trust zone may include a plurality of network entities. A particular intrazone CA 626 associated with a particular trust zone 604 may be trusted by a set of one or more network entities located in the trust zone 604. The interzone certificate repository 636 may be associated with a particular trust zone 604 that differs with respect to at least one of the trust zones 604 associated with an intrazone CA 626 and/or an intrazone CA service 628.

In one example, a first certificate aggregator 650 associated with a first intrazone CA service may obtain and/or receive a first set of one or more CA certificates and transmit the first set of one or more CA certificates to the interzone certificate repository 636. The first set of one or more CA certificates may have been issued by a first intrazone CA located in a first trust zone. The first trust zone may include a first set of one or more network entities. The first intrazone CA may be trusted by the first set of one or more network entities. Additionally, a second certificate aggregator 650 associated with a second intrazone CA service may obtain and/or receive a second set of one or more CA certificates and transmit the second set of one or more CA certificates to the interzone certificate repository 636. The second set of one or more CA certificates may have been issued by a second intrazone CA located in a second trust zone. The second trust zone may include a second set of one or more network entities. The second intrazone CA may be trusted by the second set of one or more network entities. The first certificate aggregator 650 and the second certificate aggregator 650 may aggregate the first set of one or more CA certificates and the second set of one or more CA certificates in the interzone certificate repository 636. The interzone certificate repository 636 may receive the first set of one or more CA certificates and the second set of one or more CA certificates, and may store an aggregate set of CA certificates in the interzone certificate repository 636 that includes the first set of one or more CA certificates and the second set of one or more CA certificates. A plurality of sets of CA certificates respectively associated with a different CA service and/or a different trust zone may be aggregated in the interzone certificate repository 636.

In one example, an interzone distribution service 638 may utilize the aggregate set of CA certificates to initially provision a set of interzone network entities 640. Additionally, or in the alternative, the interzone distribution service 638 may utilize the aggregate set of CA certificates to update a set of interzone network entities 640. The initial provisioning and/or updating of the set of one or more interzone network entities 640 may include configuring the set of one or more interzone network entities 640 to communicate and/or exchange data with one or more additional sets of network entities in accordance with a security protocol. The set of one or more interzone network entities 640 and the one or more additional sets of network entities may be respectively associated with a different trust zone. For example, the set of one or more interzone network entities 640 may be configured to communicate and/or exchange data with at least one set of one or more intrazone network entities 646 in accordance with an intrazone security protocol. Additionally, or in the alternative, the set of one or more interzone network entities 640 may be configured to communicate and/or exchange data with least one additional set of one or more interzone network entities in accordance with an interzone security protocol.

The initial provisioning and/or updating of the set of one or more interzone network entities 640 may include receiving entity certificates from one or more sets of network entities with respect to which the set of one or more interzone network entities 640 may be configured to communicate and/or exchange data, and authenticating the entity certificates via the aggregate set of CA certificates. In one example, interzone distribution service 638 may receive a first set of one or more entity certificates from a first set of one or more network entities. The interzone distribution service 638 may authenticate the first set of one or more entity certificates via a first set of one or more CA certificates included in the aggregate set of CA certificates. The first set of one or more entity certificates may have been issued to the first set of one or more network entities by a first intrazone CA that is trusted by the first set of one or more network entities. The interzone distribution service 638 and the first intrazone CA may be respectively associated with a different trust zone. In one example, interzone distribution service 638 may receive a second set of one or more entity certificates from a second set of one or more network entities. The interzone distribution service 638 may authenticate the second set of one or more entity certificates via a second set of one or more CA certificates included in the aggregate set of CA certificates. The second set of one or more entity certificates may have been issued to the second set of one or more network entities by a second intrazone CA that is trusted by the second set of one or more network entities. The interzone distribution service 638 and the second intrazone CA may be respectively associated with a different trust zone.

Referring further to FIG. 6B, in one example, a certificate repository 642 may include a distribution bucket 652. Digital certificates that are distributed for access by network entities may be stored in the distribution bucket 652. In one example, with reference to virtual cloud network 602*a*, interzone certificate repository 636 may include distribution bucket 652*a*. Interzone distribution service 638 may distribute digital certificates to interzone network entities 640 from distribution bucket 652*a*. In one example, with reference to virtual cloud network 602*b*, intrazone certificate repository 642 may include distribution bucket 652*b*. Intrazone distribution service 644 may distribute digital certificates to intrazone network entities 646 from distribution bucket 652*b*. In one example, a certificate publisher 648*b* associated with an intrazone CA service 628 may publish digital certificates to distribution bucket 652*b*. In one example, a certificate aggregator 650*b* associated with an intrazone CA service 628 may obtain a set of one or more CA certificates from a distribution bucket 652*b* of an intrazone certificate repository 642 and may transmit the set of one or more CA certificates to an interzone certificate repository 636. A plurality of sets of one or more CA certificates may be transmitted to, and stored in, the interzone certificate repository 636, for example, by a plurality of different certificate aggregators 650*b*.

In one example, with reference to virtual cloud network 602*a*, an interzone certificate repository 636 may include an aggregate bucket 654. CA certificates transmitted to the interzone certificate repository 636 by various certificate aggregators 650*b* may be stored in the aggregate bucket 654. In one example, a certificate aggregator 650*a* associated with an interzone CA service 618 may obtain sets of CA certificates stored in the aggregate bucket 654 and generate an aggregate set of CA certificates that includes the sets of CA certificates obtained from the aggregate bucket 654. The certificate aggregator 650*a* associated with the interzone CA service 618 may store the aggregate set of CA certificates in the distribution bucket 652*a* of the interzone certificate repository 636. The interzone distribution service 638 may distribute the aggregate set of CA certificates from the distribution bucket 652*a* to one or more interzone network entities 640*a*. The aggregate set of CA certificates may be utilized by the one or more interzone network entities 640*a* to authenticate network entities, such as intrazone network entities 646, from different trust zones.

ii. Aggregating Sets of Intrazone CA Certificates with Sets of Interzone CA Certificates.

Referring further to FIG. 6B, in one example, an interzone CA 616 may generate interzone CA certificates that may be utilized by network entities to authenticate interzone entity certificates issued by the interzone CA 616 to interzone network entities 640. In one example, the interzone CA certificates may be transmitted to different trust zones 604 and distributed to one or more network entities, such as intrazone network entities 646, located in the different trust zones. The network entities, such as the intrazone network entities 646, may utilize the interzone CA certificates to authenticate interzone entity certificates issued to the interzone network entities 640 by the interzone CA 616. In one example, a certificate publisher 648*a* associated with an interzone CA 616 may publish sets of one or more interzone CA certificates to the interzone certificate repository 636. The interzone certificate repository may include an interzone bucket 656. The sets of one or more interzone CA certificates published to the interzone certificate repository 636 by the certificate publisher 648*a* may be stored in the interzone bucket 656.

In one example, one or more certificate aggregators 650*b* respectively associated with a particular intrazone CA service 628 and/or a particular trust zone 604 may obtain a set of one or more interzone CA certificates from the interzone certificate repository 636, such as from the interzone bucket 656. A certificate aggregator 650*b* that obtains a set of one or more interzone CA certificates from the interzone certificate repository 636 may store the set of one or more interzone CA certificates in an intrazone certificate repository 642 associated with the particular intrazone CA service 628 and/or the particular trust zone 604 corresponding to the certificate aggregator 650*b*. For example, the certificate aggregator 650*b* may store the set of one or more interzone CA certificates in the distribution bucket 652*b* of the intrazone certificate repository 642. The set of one or more interzone CA certificates may be aggregated with a set of one or more intrazone CA certificates generated by an intrazone CA 626. An aggregate set of CA certificates that includes the set of one or more interzone CA certificates and the set of one or more intrazone CA certificates may be distributed for access by one or more network entities at least by storing the aggregate set of CA certificates in the intrazone certificate repository 642. The intrazone distribution service 644*b* may obtain the aggregate set of CA certificates from the intrazone certificate repository 642, such as from the distribution bucket 652*b*, and may distribute the aggregate set of CA certificates to one or more intrazone network entities.

In one example, a first certificate aggregator 650*a* associated with an interzone CA service 618 may obtain and/or receive a first set of one or more interzone CA certificates from an interzone certificate repository 636, such as from an interzone bucket 656 of the interzone certificate repository. The first certificate aggregator 650*a* may transmit the first set of one or more interzone CA certificates to an intrazone certificate repository 642. Additionally, or in the alternative, a second certificate aggregator 650*b* associated with an intrazone CA service 628 may obtain and/or receive the first set of one or more interzone CA certificates from the interzone certificate repository 636, such as from the interzone bucket 656 of the interzone certificate repository. The second certificate aggregator 650*b* may store the first set of one or more interzone CA certificates in the intrazone certificate repository 642, such as in the distribution bucket 652*b* of the intrazone certificate repository 642. The first set of one or more interzone CA certificates may have been issued by an interzone CA 616 located in a first trust zone 604*a*. The first trust zone 604*a* may include a first set of one or more network entities, such as a first set of one or more interzone network entities 640. The first interzone CA 616 may be trusted by the first set of one or more network entities, such as a first set of one or more interzone network entities 640. Additionally, a certificate publisher 648*b* associated with the intrazone CA service 628 may publish a second set of one or more intrazone CA certificates to the intrazone certificate repository 642, such as to the distribution bucket 652*b* of the intrazone certificate repository 642. The second set of one or more intrazone CA certificates may have been issued by an intrazone CA 626 located in a second trust zone 604*b*. The second trust zone 604*b* may include a second set of one or more network entities, such as a second set of one or more intrazone network entities 646. The intrazone CA 626 may be trusted by the second set of one or more network entities, such as the second set of one or more intrazone network entities 646. The first set of one or more interzone CA certificates and the second set of one or more intrazone CA certificates may be aggregated in the intrazone certificate repository 642, such as in the distribution bucket 652. The intrazone certificate repository 642, such as in the distribution bucket 652, may include an aggregate set of CA certificates that includes the first set of one or more interzone CA certificates and the second set of one or more intrazone CA certificates.

In one example, an intrazone distribution service 644*b* may utilize the aggregate set of CA certificates to initially provision a set of intrazone network entities 646. Additionally, or in the alternative, the intrazone distribution service 644*b* may utilize the aggregate set of CA certificates to update a set of intrazone network entities 646. The initial provisioning and/or updating of the set of one or more intrazone network entities 646 may include configuring the set of one or more intrazone network entities 646 to communicate and/or exchange data with one or more additional sets of network entities in accordance with a security protocol. The set of one or more intrazone network entities 646 and the one or more additional sets of network entities may be respectively associated with a different trust zone. For example, the set of one or more intrazone network entities 646 may be configured to communicate and/or exchange data with at least one set of one or more interzone network entities 640 in accordance with an interzone security protocol. Additionally, or in the alternative, the set of one or more intrazone network entities 646 may be configured to communicate and/or exchange data with least one additional set of one or more intrazone network entities in accordance with an intrazone security protocol.

The initial provisioning and/or updating of the set of one or more intrazone network entities 646 may include receiving entity certificates from one or more sets of network entities with respect to which the set of one or more intrazone network entities 646 may be configured to communicate and/or exchange data, and authenticating the entity certificates via the aggregate set of CA certificates. In one example, intrazone distribution service 644*b* may receive a first set of one or more entity certificates from a first set of one or more network entities. The intrazone distribution service 644*b* may authenticate the first set of one or more entity certificates via a first set of one or more CA certificates included in the aggregate set of CA certificates. The first set of one or more entity certificates may have been issued to the first set of one or more network entities by an intrazone CA 626 that is trusted by the first set of one or more network entities. The first set of one or more network entities may include a first set of one or more intrazone network entities 646. The first set of one or more CA certificates may include a first set of one or more intrazone CA certificates. The intrazone distribution service 644*b* and the intrazone CA 626 may be respectively associated with the same trust zone, such as trust zone 604*b*. In one example, the intrazone distribution service 644*b* may receive a second set of one or more entity certificates from a second set of one or more network entities. The intrazone distribution service 644*b* may authenticate the second set of one or more entity certificates via a second set of one or more CA certificates included in the aggregate set of CA certificates. The second set of one or more entity certificates may have been issued to the second set of one or more network entities by an interzone CA 616 that is trusted by the second set of one or more network entities. The second set of one or more network entities may include a second set of one or more interzone network entities 640. The second set of one or more CA certificates may include a second set of one or more interzone CA certificates. The intrazone distribution service 644*b* and the interzone CA 616 may be respectively associated with a different trust zone. For example, the interzone CA 616 may be associated with trust zone 604*a*, and the intrazone distribution service 644*b* may be associated with trust zone 604*b*.

In one example, with reference to virtual cloud network 602*a*, an intrazone distribution service 644*n* may distribute intrazone CA certificates to one or more network entities, such as one or more interzone network entities 640. The intrazone CA certificates may be generated by an intrazone CA and stored in an intrazone bucket 658 of a certificate repository. For example, the interzone certificate repository 636 may include an interzone bucket 656 and an intrazone bucket 658. Interzone CA certificates may be stored in the interzone bucket 656 of the interzone certificate repository 636. Intrazone CA certificates may be stored in the intrazone bucket 658 of the interzone certificate repository 636. The interzone distribution service 638 may distribute the interzone CA certificates to one or more network entities, such as one or more interzone network entities. The intrazone distribution service 644n may distribute the intrazone CA certificates to one or more network entities, such as one or more interzone network entities and/or one or more intrazone network entities. Additionally, or in the alternative, the interzone CA certificates and the intrazone CA certificates may be aggregated and stored in the distribution bucket 652a of the interzone certificate repository 636.

D. Communications within and Between Trust Zones.

Figure 6C:
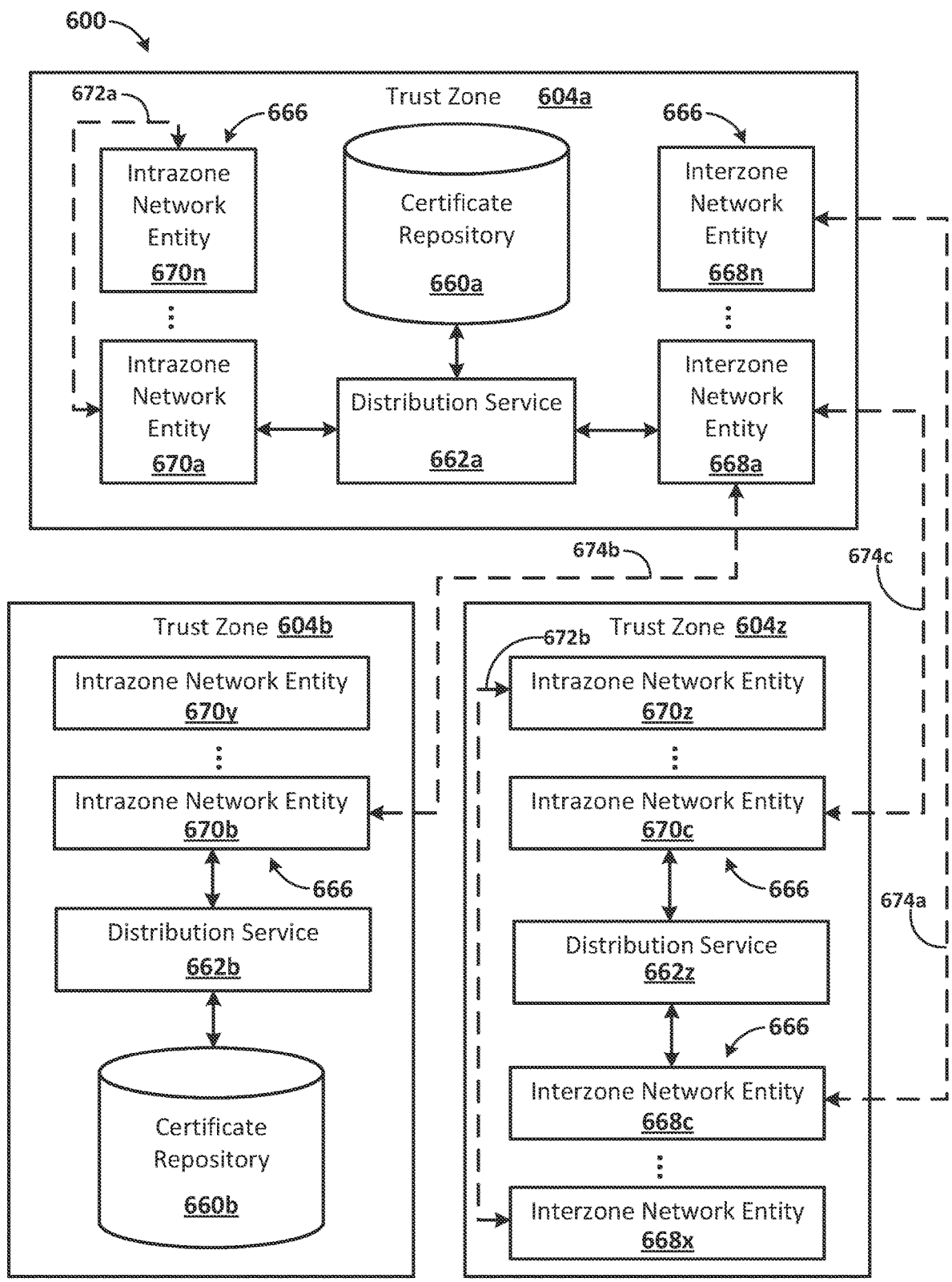

Referring now to FIG. 6C, architecture and operations associated with aggregating CA certificates are further described. As shown in FIG. 6C, the system 600 may include a plurality of trust zones 604, such as trust zone 604a, trust zone 604b, and trust zone 604z. A trust zone 604 may include at least one certificate repository 660. For example, trust zone 604a may include certificate repository 660a, and trust zone 604b may include certificate repository 660b. A trust zone 604 may include at least one distribution service 662. For example, trust zone 604a may include distribution service 662a, trust zone 604b may include distribution service 662b, and trust zone 604z may include distribution service 662z. The distribution service 662 associated with a trust zone 604 may distribute a set of aggregate CA certificates to one or more sets of more network entities 666 located in the trust zone 604. The one or more sets of network entities 666 may include a set of one or more interzone network entities 668 and/or a set of one or more intrazone network entities 670. In one example, trust zone 604a may include a first set of one or more interzone network entities 668 (e.g., interzone network entity 668a and interzone network entity 668n) and a first set of one or more intrazone network entities 670 (e.g., intrazone network entity 670a and intrazone network entity 670n). In one example, trust zone 604b may include a second set of one or more intrazone network entities 670 (e.g., intrazone network entity 670b and intrazone network entity 670y). In one example, trust zone 604z may include a second set of one or more interzone network entities 668 (e.g., interzone network entity 668c and interzone network entity 6682) and a third set of one or more intrazone network entities 670 (e.g., intrazone network entity 670c and intrazone network entity 670z).

The system 600 may be configured for communication and/or data exchange among network entities 666 within and/or between trust zones 604 in accordance with one or more security protocols. Network entities 666 located in the same trust zone may communicate and/or exchange data with one another in accordance with an intrazone security protocol. Network entities 666 located in different trust zones may communicate and/or exchange data with one another in accordance with an interzone security protocol.

i. Example Intrazone Security Protocols.

In one example, an intrazone network entity 670 may communicate and/or exchange data with another network entity 666 located in the same trust zone in accordance with an intrazone security protocol. The intrazone security protocol may include the intrazone network entity 670 authenticating an entity certificate presented by the other network entity 666 using a CA certificate of a CA that issued the entity certificate to the other network entity 666. The other network entity 666 authenticated by the intrazone network entity 670 may be another intrazone network entity 670 or an interzone network entity 668. The CA certificate used by the intrazone network entity 670 to authenticate the entity certificate may be included in the set of aggregate CA certificates distributed to the intrazone network entity 670.

As shown in FIG. 6C, with reference to trust zone 604a, intrazone network entity 670a may authenticate intrazone network entity 670n in accordance with the intrazone security protocol. Additionally, or in the alternative, intrazone network entity 670n may authenticate intrazone network entity 670a in accordance with the intrazone security protocol. Upon having authenticated one another, intrazone network entity 670a and intrazone network entity 670n may communicate and/or exchange data with one another, for example, via an intrazone network connection 672a.

As further shown in FIG. 6C, with reference to trust zone 604z, interzone network entity 668x may authenticate intrazone network entity 670z in accordance with the intrazone security protocol. Additionally, or in the alternative, intrazone network entity 670z may authenticate interzone network entity 668x in accordance with the intrazone security protocol. Upon having authenticated one another, intrazone network entity 670z and interzone network entity 668x may communicate and/or exchange data with one another, for example, via an intrazone network connection 672b.

ii. Example Interzone Security Protocols.

In one example, an interzone network entity 668 may communicate and/or exchange data with another network entity 666 located in a different trust zone in accordance with an interzone security protocol. The interzone security protocol may include the interzone network entity 668 authenticating an entity certificate presented by the other network entity 666 using a CA certificate of a CA that issued the entity certificate to the other network entity 666. The other network entity 666 authenticated by the interzone network entity 668 may be another interzone network entity 668 or an intrazone network entity 670. The CA certificate used by the interzone network entity 668 to authenticate the entity certificate may be included in the set of aggregate CA certificates distributed to the interzone network entity 668.

As shown in FIG. 6C, with reference to trust zone 604a and trust zone 604z, interzone network entity 668n, located in trust zone 604a, may authenticate interzone network entity 668c, located in trust zone 604z, in accordance with the interzone security protocol. Additionally, or in the alternative, interzone network entity 668c, located in trust zone 604z, may authenticate interzone network entity 668n, located in trust zone 604a, in accordance with the interzone security protocol. Upon having authenticated one another, interzone network entity 668n and interzone network entity 668c may communicate and/or exchange data with one another across trust zone boundary 608a and/or trust zone boundary 608z, for example, via an interzone network connection 674a.

As further shown in FIG. 6C, with reference to trust zone 604a and trust zone 604b, intrazone network entity 670b, located in trust zone 604b, may authenticate interzone network entity 668a, located in trust zone 604a, in accordance with the interzone security protocol. Additionally, or in the alternative, interzone network entity 668a, located in trust zone 604a, may authenticate intrazone network entity 670b, located in trust zone 604a, in accordance with the interzone security protocol. Upon having authenticated one another, intrazone network entity 670b and interzone network entity 668a may communicate and/or exchange data with one another across trust zone boundary 608a and/or trust zone boundary 608b, for example, via an interzone network connection 674b.

As further shown in FIG. 6C, with reference to trust zone 604a and trust zone 6047, intrazone network entity 670c, located in trust zone 604z, may authenticate interzone network entity 668a, located in trust zone 604a, in accordance with the interzone security protocol. Additionally, or in the alternative, interzone network entity 668*a*, located in trust zone 604*a*, may authenticate intrazone network entity 670*c*, located in trust zone 604*z*, in accordance with the interzone security protocol. Upon having authenticated one another, intrazone network entity 670*c* and interzone network entity 668*a* may communicate and/or exchange data with one another across trust zone boundary 608*a* and/or trust zone boundary 608*z*, for example, via an interzone network connection 674*c*.

In one example, an intrazone network entity 670 may communicate and/or exchange data with another intrazone network entity 670 located in a different trust zone upon both intrazone network entities 670 having authenticated with an interzone network entity 668 in accordance with an intrazone security protocol. In one example, the interzone network entity 668 may be an intermediate service host. The intermediate service host may act as an intermediary for authenticating intrazone network entities 670 located in different trust zones 604 from one another.

In one example, the communication and/or exchange of data between the intrazone network entities 670 may be routed through the interzone network entity 668. For example, the interzone network entity 668 may communicate and/or exchange data with each of the intrazone network entities 670 across at least one trust zone boundary 608 in accordance with the intrazone security protocol. Additionally, or in the alternative, the interzone security protocol may preclude the intrazone network entities 670 located in the different trust zones 604 from communicating and/or exchanging data directly with one another across a trust zone boundary 608. The intrazone network entities 670 located in the different trust zones 604 may indirectly communicate and/or exchange data with one another across at least one trust zone boundary 608 via the interzone network entity 668 in accordance with the interzone security protocol, for example, upon having authenticated with the interzone network entity 668. The interzone security protocol may preclude the intrazone network entities 670 located in the different trust zones 604 from communication and/or exchange data with another across a trust zone boundary 608 via the interzone network entity 668 unless the intrazone network entities 670 have authenticated with the interzone network entity 668.

In one example, intrazone network entities 670 located in different trust zones 604 may communicate and/or exchange data directly with one another across one or more trust zone boundaries 608 upon having authenticated with an interzone network entity 668, such as an intermediate service host. In one example, upon having authenticated with the interzone network entity 668, such as the intermediate service host, the intrazone network entities 670 may authenticate with one another in accordance with an interzone security protocol prior to communicating and/or exchanging data directly with one another across one or more trust zone boundaries 608. The interzone security protocol may preclude the intrazone network entities 670 located in the different trust zones 604 from communication and/or exchange data with one another across one or more trust zone boundaries 608 via the interzone network entity 668 unless the intrazone network entities 670 have authenticated with the interzone network entity 668 and with one another.

As shown in FIG. 6C, intrazone network entity 670*b*, located in trust zone 604*b*, and interzone network entity 668*a*, located in trust zone 604*a*, may authenticate with one another in accordance with the interzone security protocol. Additionally, intrazone network entity 670*c*, located in trust zone 604*z*, and interzone network entity 668*a*, located in trust zone 604*a*, may authenticate with one another in accordance with the interzone security protocol. Upon having respectively authenticated with interzone network entity 668*a*, intrazone network entity 670*b* and intrazone network entity 670*c* may communicate and/or exchange data with one another across one or more trust zone boundaries 608, for example, indirectly via interzone network entity 668*a*, via interzone network connection 674*b* and interzone network connection 674*c*. Additionally, or in the alternative, upon having respectively authenticated with interzone network entity 668*a*, intrazone network entity 670*b* and intrazone network entity 670*c* may authenticate with one another prior to communicating and/or exchanging data with one another across the one or more trust zone boundaries 608. Upon having authenticated with one another, intrazone network entity 670*b* and intrazone network entity 670*c* may directly or indirectly communicate and/or exchange data with one another across the one or more trust zone boundaries 608.

In one example, a system 600 may include overlapping trust zones 604. For example, different CAs may respectively generate CA certificates that may be utilized by overlapping sets of network entities 666 for different purposes. In one example, a network entity 666 may operate as an intrazone network entity 670 in accordance with an intrazone security protocol with respect to a first trust zone 604. Additionally, the network entity 666 may operate as an interzone network entity 668 in accordance with an interzone security protocol with respect to a second trust zone 604.

In one example, an intermediate service host may operate as an intrazone network entity 670 in accordance with an intrazone security protocol with respect to a first trust zone 604, and as an interzone network entity 668 in accordance with an interzone security protocol with respect to a second trust zone 604.

For example, the intermediate service host may be located in a home region and/or a home VCN. The intermediate service host may communicate and/or exchange data with a first set of one or more network entities 666, such as one or more intrazone network entities 670, located in the home region and/or a home VCN in accordance with an intrazone security protocol associated with a first trust zone 604. The intrazone security protocol may include using a first CA certificate issued by a first CA associated with the first trust zone 604 to authenticate a first set of one or more entity certificates issued to the first set of one or more network entities 666. In one example, the first CA may be an intrazone CA. Additionally, the intermediate service host may communicate and/or exchange data with a second set of one or more network entities 666, such as one or more interzone network entities 668, located in the home region and/or the home VCN in accordance with an interzone security protocol associated with a second trust zone 604. The interzone security protocol may include using a second CA certificate issued by a second CA associated with the second trust zone 604 to authenticate a second set of one or more entity certificates issued to the second set of one or more network entities 666. In one example, the second CA may be an interzone CA. In one example, the intermediate service host may facilitate communications and/or data exchange between a home trust zone and one or more ancillary trust zones, and/or between different ancillary zones, that are authenticated using the second CA certificate of the second CA. Additionally, the intermediate service host may communicate and/or exchange data with network entities 666 located in the home trust zone, that are authenticated using the first CA certificate of the first CA.

In one example, the first CA certificate may be a root CA certificate and the second CA certificate may be an intermediate CA certificate. The intermediate CA certificate may be issued by the first CA based on the root CA certificate. In one example, the intermediate service host may authenticate network entities 666 located in the first trust zone 604 based on entity certificates issued by the first CA based on the root CA certificate. In one example, the intermediate service host may authenticate network entities 666 located in the second trust zone 604 based on entity certificates issued by the second CA based on the intermediate CA certificate.

E. Virtual Cloud Network Architecture.

Figure 6D:
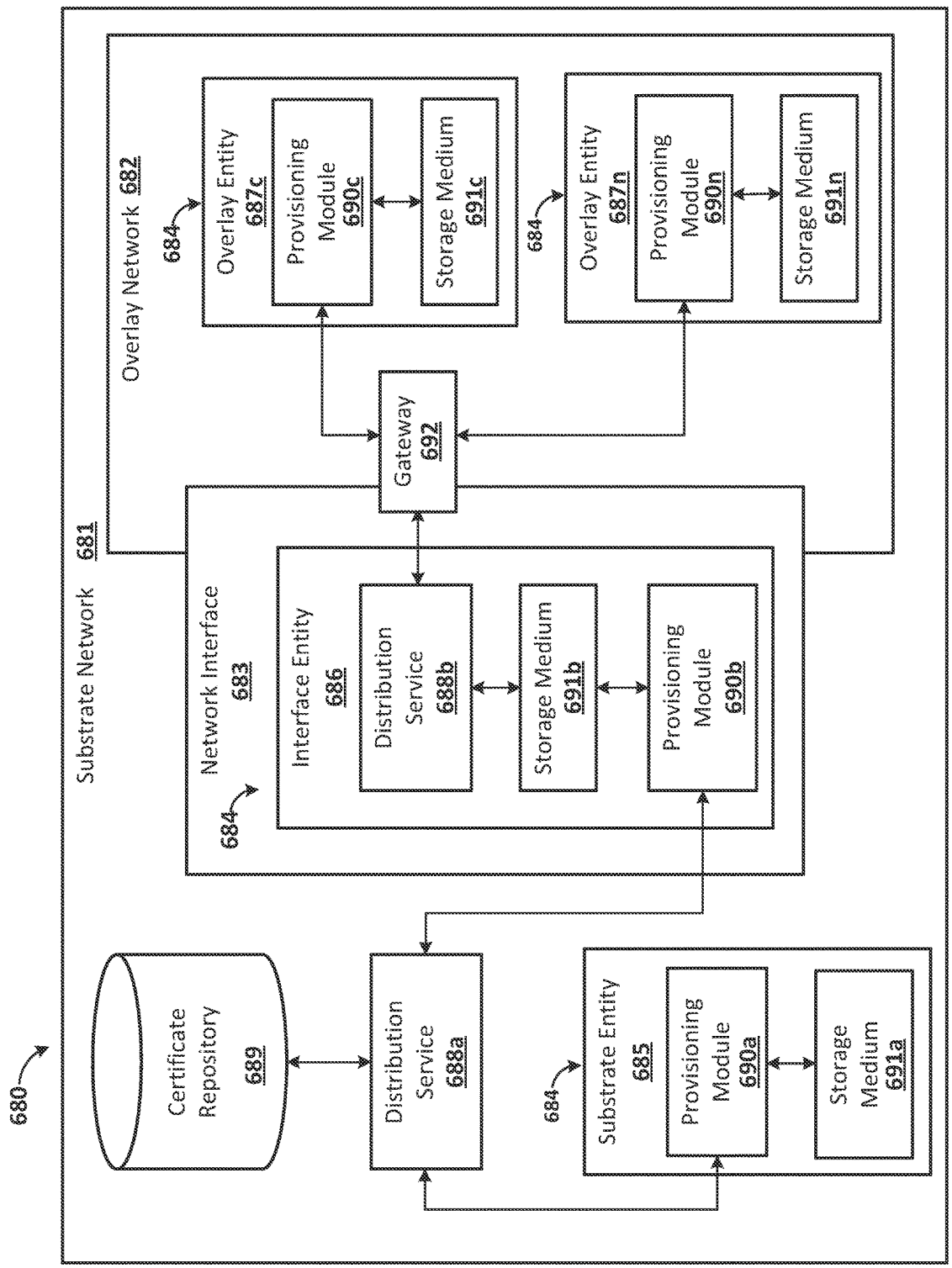

Referring now to FIG. 6D, the system 600 is further described with reference to an example virtual cloud network 680. The virtual cloud network 680 may include or correspond to one or more of the virtual cloud networks 602 described with reference to FIGS. 6A and/or 6B. As shown in FIG. 6D, the virtual cloud network 680 may include a substrate network 681, an overlay network 682, and a network interface 683 that provides communication between the substrate network 681 and the overlay network 682. The system 600 may include a plurality of network entities 684 located throughout the virtual cloud network 680. The plurality of network entities 684 may correspond to the plurality of network entities described with reference to FIGS. 6A-6C. A network entity 684 may reside on the substrate network 681, the overlay network 682, or the network interface 683. A network entity 684 may be implemented in hardware and/or software in association with the virtual cloud network, such as a node, a host, an agent, a service, a component, an endpoint, or other element. The plurality of network entities 684 may include one or more substrate entities 685, one or more interface entities 686, and/or one or more overlay entities 687.

As used herein, the term "substrate entity" refers to a network entity 684 implemented in a substrate network 681. As used herein, the term "substrate network" refers to a physical network infrastructure. The substrate network generally provides a foundation of a virtual cloud network. The substrate network 681 may include physical network devices, such as routers, switches, network links, and other networking components. The substrate network 681 may generally provide the basic connectivity and transport capabilities necessary for data transmission within and between data centers.

The one or more substrate entities 685 may include substrate hosts, routers, firewall appliances, load balancers, storage devices, and/or substrate services. A substrate host may include an endpoint within the substrate network 681, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity 685 may include a combination of hardware and software. In one example, the one or more substrate entities 685 may include one or more substrate hosts, and/or one or more substrate services. In one example, a substrate host may include a bare metal host. In one example, a substrate service may include a firmware service. The substrate entities 685 may communicate with one another, and/or with other network entities 684, using logical network addresses assigned within the overlay network.

As used herein, the term "network interface" refers to a communication interface between a substrate network and an overlay network, such as a network interface card, a smartNIC, or the like. A network interface 683 may include one or more interface entities 686, such as a node on the network interface 683, or an interface service executing or executable on the network interface 683. A node on the network interface 683 may include a programmable hardware component, a memory component, or a gateway component. In one example, a network interface 683 may include a network interface card, such as a smartNIC. Additionally, or in the alternative, a network interface 683 may include a node or an endpoint on a network interface card or smartNIC.

A gateway component may provide connectivity between the substrate network 681 and the network interface 683, and/or between the network interface 683 and the overlay network 682. For example, a gateway component may enable communication between overlay entities 687 and substrate entities 685. Additionally, or in the alternative, a gateway component may provide connectivity between the overlay network 682 and external networks, such as the internet or other networks outside the overlay network. For example, an overlay gateway may enable communication between overlay entities 687 and external endpoints.

As used herein, the term "overlay network" refers to a virtual network built on a substrate network using software-defined networking (SDN), virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity 684 implemented on an overlay network 682. The overlay network 682 may include a plurality of overlay entities 687. The plurality of overlay entities 687 may include overlay hosts, overlay services, subnets, overlay controllers, and/or overlay clients. In one example, the overlay network 682 may include a plurality of overlay entities 687, such as overlay entity 687*c* and overlay entity 687*n*. In one example, an overlay entity 687 may include an overlay host. Additionally, or in the alternative, an overlay entity 687 may include an overlay service. The plurality of overlay entities 687 may communicate with one another using logical network addresses assigned within the overlay network 682.

An overlay host may include an endpoint within the overlay network 682, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

Referring further to FIG. 6D, the system 600 may include at least one distribution service 688 and at least one certificate repository 689. The at least one distribution service 688 may correspond to a distribution service described with reference to FIGS. 6A-6C. A distribution service 688 may be configured to distribute certificate bundles to at least some of the network entities 684. The certificate bundles may be housed in a certificate repository 689 accessible by the distribution service 688. The certificate repository 689 may correspond to a certificate repository described with reference to FIGS. 6A-6C. The distribution service 688 may retrieve a certificate bundle from the certificate repository 689 and transmit the certificate bundle to one or more of the network entities 684.

In one example, a first distribution service 688a may be implemented on the substrate network 681. A distribution service 688 implemented on the substrate network 681 may be communicatively coupled with one or more substrate entities 685 on the substrate network 681. Additionally, or in the alternative, a distribution service 688 implemented on the substrate network 681 may be communicatively coupled with the network interface 683, such as with one or more interface entities 686 on the network interface 683. For example, the first distribution service 688a may obtain certificate bundles from the certificate repository 689 and distribute the certificate bundles to one or more substrate entities 685 on the substrate network 681 and/or to one or more interface entities 686 on the network interface 683.

In one example, a second distribution service 688b may be implemented on the network interface 683. A distribution service 688 implemented on the network interface 683 may be communicatively coupled with the overlay network 682 and/or the substrate network 681. For example, the second distribution service 688b implemented on the network interface 683 may be communicatively coupled with one or more overlay entities 687 on the overlay network 682. The second distribution service 688b may distribute certificate bundles to one or more overlay entities 687 on the overlay network 682. In one example, the second distribution service 688b may obtain certificate bundles from a storage medium associated with the network interface 683, such as from a storage medium associated with an interface entity 686 on the network interface 683. For example, the second distribution service 688b may distribute a certificate bundle that has been installed in the storage medium associated with the network interface 683 and/or the interface entity 686. In one example, the first distribution service 688a may distribute a certificate bundle to an interface entity 686 on the network interface 683, and the second distribution service 688b may distribute the certificate bundle to one or more overlay entities 687 on the overlay network 682 after the certificate bundle has been installed in the storage medium associated with the interface entity 686.

As shown in FIG. 6D, each network entity 684 may include a provisioning module 690 and a storage medium 691. The provisioning module 690 associated with a network entity 684 may receive certificate bundles from the distribution service 688 and install the certificate bundle in the storage medium 691 associated with the network entity 684. The distribution service 688 may distribute a certificate bundle to the provisioning module 690 in connection with an initial provisioning of the network entity 684 and/or in connection with a periodic update. Additionally, or in the alternative, the distribution service 688 may distribute a certificate bundle to the provisioning module 690 in accordance with a respective phase of a certificate bundle distribution process.

In one example, a provisioning module 690 of an overlay entity 687 may send requests for a certificate bundle to a distribution service 688 by way of a gateway 692 between the network interface 683 and the overlay entities 687. Additionally, or in the alternative, the distribution service 688 may send the certificate bundles to the overlay entities 687 by way of the gateway 692, for example, in response to a request from a provisioning module 690. In one example, the gateway 692 may be a metadata interface configured for exchanging metadata between the network interface 683 and the overlay entities 687 In one example, the gateway 692 may be utilized between the network interface 683 and each of the overlay entities 687. Additionally, or in the alternative, the network interface 683 may include a set of gateways 692, with each gateway 692 corresponding to a respective overlay entity 687.

The certificate repository 689 may include a storage medium on the substrate network 681 or other physical hardware associated with the virtual cloud network. The certificate repository 689 may include any type of storage unit and/or device (e.g., a file system, database, collection of tables, or any other storage mechanism) for storing data. Further, the certificate repository 689 may include multiple different storage units and/or devices. The multiple different storage units and/or devices may or may not be of the same type or located at the same physical site. Further, the certificate repository 689 may be implemented or executed on the same computing system as the distribution service 688 and/or one or more of the network entities 684. Additionally, or in the alternative, the certificate repository 689 may be implemented or executed on a computing system separate from the distribution service 688 and/or one or more of the network entities 684. The certificate repository 689 may be communicatively coupled to the distribution service 688 and/or one or more of the network entities 684 via a direct connection or via a network.

In one or more embodiments, the system 600 may include more or fewer components than the components illustrated in FIGS. 6A-6D. The components illustrated in FIGS. 6A-6D may be local to or remote from each other. The components illustrated in FIGS. 6A-6D may include software and/or hardware components. Each component may be distributed over multiple applications and/or machines. Multiple components may be combined into one application and/or machine. Operations described with respect to one component may instead be performed by another component. Additional embodiments and/or examples relating to the system 600 are described above in Section 2, titled "Cloud Computing Technology".

In an embodiment, the system 600 may include various components implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

Referring further to FIGS. 6A-6D, example trust zones 604 are further described. In one example, a trust zone 604 may include a set of one or more substrate networks 681. The one or more substrate networks 681 included in a trust zone 604 may be associated with a particular region 606, a particular virtual cloud network 602, and/or a particular portion of a virtual cloud network 602. For example, a first trust zone 604a may include first set of one or more substrate networks 681. Additionally, or in the alternative, a second trust zone 604b may include a second set of one or more substrate networks 681. The first set of one or more substrate networks 681 of the first trust zone 604 may be associated with at least one of: a first set of one or more regions 606, a first set of one or more virtual cloud networks 602, or a first set of one or more portions of one or more virtual cloud networks 602. The second set of one or more substrate networks 681 of the second trust zone 604 may be associated with at least one of: a second set of one or more regions 606, a second set of one or more virtual cloud networks 602, or a second set of one or more portions of one or more virtual cloud networks 602.

In one example, a trust zone may include a set of one or more overlay networks 682. The one or more overlay networks 682 included in a trust zone 604 may be associated with a particular region 606, a particular virtual cloud network 602, and/or a particular portion of a virtual cloud network 602. For example, a first trust zone 604a may include first set of one or more overlay networks 682. Additionally, or in the alternative, a second trust zone 604b may include a second set of one or more overlay networks 682. The first set of one or more overlay networks 682 of the first trust zone 604 may be associated with at least one of: a first set of one or more regions 606, a first set of one or more virtual cloud networks 602, or a first set of one or more portions of one or more virtual cloud networks 602. The second set of one or more overlay networks 682 of the second trust zone 604 may be associated with at least one of: a second set of one or more regions 606, a second set of one or more virtual cloud networks 602, or a second set of one or more portions of one or more virtual cloud networks 602.

In one example, a trust zone boundary 608 may separate a set of one or more substrate networks 681 from a set of one or more overlay networks 682. The set of one or more substrate networks 681 may be associated with a first trust zone 604a that does not include an overlay network 682, and the set of one or more overlay networks 682 may be associated with a second trust zone 604b that does not include a substrate network 681. The first trust zone 604a may include each of a plurality of substrate networks 681 corresponding to at least one of: a first set of one or more regions 606, a first set of one or more virtual cloud networks 602, or a first set of one or more portions of one or more virtual cloud networks 602. The second trust zone 604b may include each of a plurality of overlay networks 682 corresponding to at least one of: the first set of one or more regions 606, the first set of one or more virtual cloud networks 602, or the first set of one or more portions of one or more virtual cloud networks 602.

5. Aggregating Certificate Authority Certificates

Figure 7:
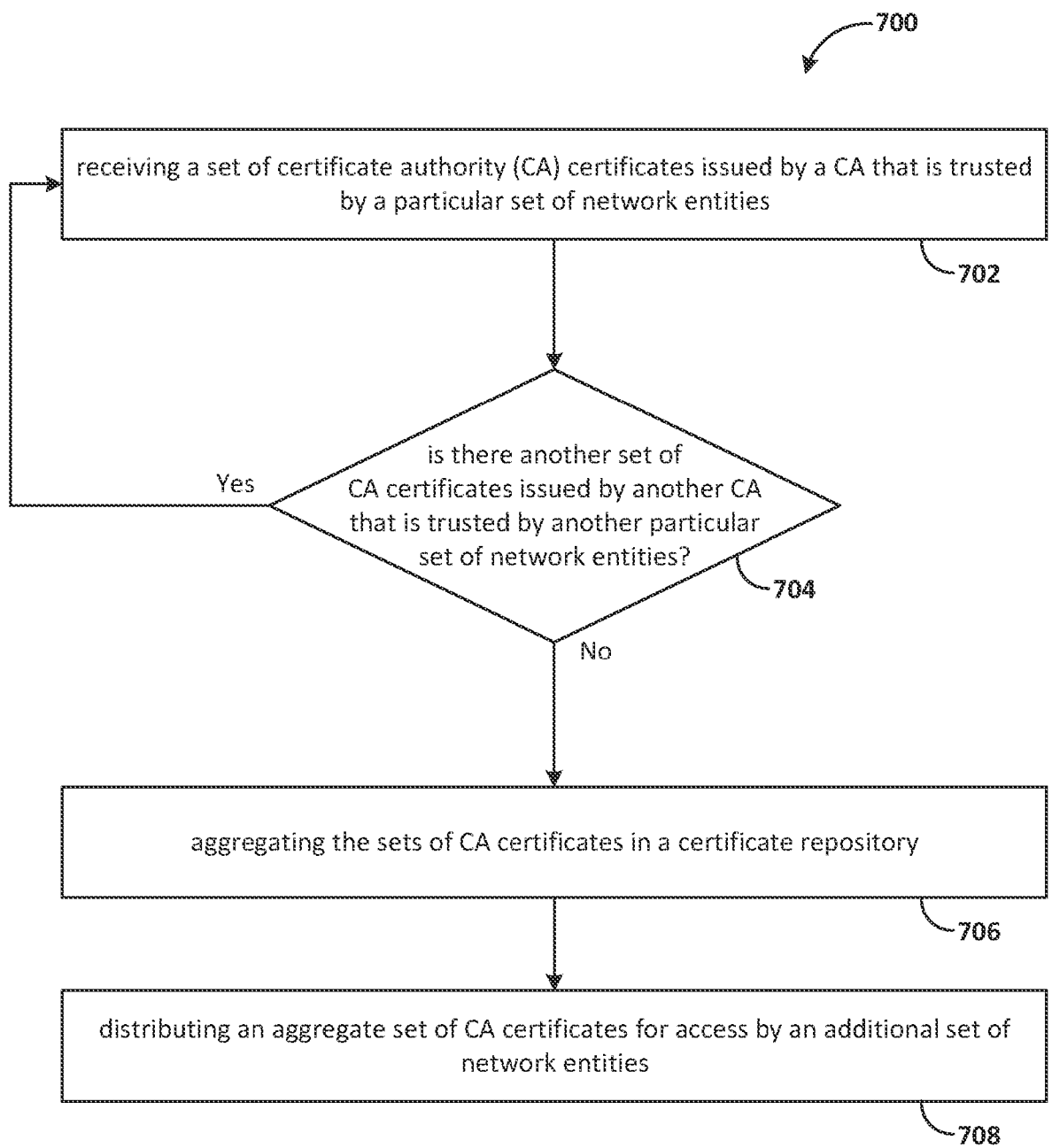
FIG. 7 is a flowchart that illustrates example operations pertaining to aggregating CA certificates in accordance with one or more embodiments.

Referring now to FIG. 7, operations 700 pertaining to validating certificate bundles are further described. The operations 700 described with reference to FIG. 7 may represent at least a portion of a process for distributing certificate bundles to network entities and/or provisioning cloud resource instances, as respectively described herein. One or more operations 700 described with reference to in FIG. 7 may be modified, combined, rearranged, or omitted all together. Accordingly, the particular sequence of operations 700 described with reference to FIG. 7 should not be construed as limiting the scope of one or more embodiments.

As shown in FIG. 7, the operations 700 may include, at block 702, receiving a set of CA certificates issued by a CA that is trusted by a particular set of one or more network entities. The CA certificates may be received from a CA service associated with the CA that issued the set of CA certificates. The CA service may be located in a particular trust zone. Additionally, or in the alternative, the particular set of one or more network entities may be located in particular trust zone. At block 704, the operations 700 may include determining whether there is another set of CA certificates issued by another CA that is trusted by another particular set of one or more network entities. When there is another set of CA certificates, the operations may return to block 702. At block 704, when there are no further sets of CA certificates issued by another CA, the operations may proceed to block 706. At block 706, the operations 700 may include aggregating the sets of CA certificates in a certificate repository.

At block 708, the operations 700 may include distributing an aggregate set of CA certificates for access by an additional set of one or more network entities. The aggregate set of CA certificates may include each of the sets of CA certificates received at block 702. The aggregate set of CA certificates may include a plurality of sets of CA certificates. The additional set of one or more network entities may access the aggregate set of CA certificates, and may utilize the plurality of sets of CA certificates of the aggregate set of CA certificates, including, with respect to a particular set of CA certificates, to authenticate entity certificates issued to the particular set of one or more network entities by the particular CA corresponding to the particular set of CA certificates of the aggregate set of CA certificates.

In one example, distributing the aggregate set of CA certificates for access by the additional set of one or more network entities may include storing the aggregate set of CA certificates in a certificate repository located in a different trust zone. The certificate repository may be accessible, directly or indirectly, by the additional set of one or more network entities. Additionally, or in the alternative, distributing the aggregate set of CA certificates for access by the additional set of one or more network entities may include transmitting a notification to the additional set of one or more network entities. The notification may indicate that the aggregate set of CA certificates is available in a certificate repository located, for example, in a different trust zone, for distribution to the additional set of one or more network entities. Additionally, or in the alternative, distributing the aggregate set of CA certificates for access by the additional set of one or more network entities may include determining that the aggregate set of CA certificates is available in the certificate repository, located, for example, in a different trust zone. Responsive to determining that the aggregate set of CA certificates is available in the certificate repository, the additional set of one or more network entities may download the aggregate set of CA certificates from the certificate repository and may store the aggregate set of CA certificates in an additional certificate repository accessible, directly or indirectly, by the additional set of one or more network entities. In one example, the aggregate set of CA certificates may be downloaded and stored in an additional certificate repository that is located in a different trust zone relative to the certificate repository from which the aggregate set of CA certificates is downloaded.

In one example, the operations at block 702 may include receiving, from a first CA service associated with a first CA, a first set of one or more CA certificates issued by the first CA. The first CA service may be located in a first trust zone. The first CA may be trusted by a first set of one or more network entities. Additionally, or in the alternative, operations at block 702 may include receiving, from a second CA service associated with a second CA, a second set of one or more CA certificates issued by the second CA. The second CA service may be located in a second trust zone. The second CA may be trusted by a second set of one or more network entities. The operations at block 706 may include aggregating in a certificate repository, the first set of one or more CA certificates and the second set of one or more CA certificates. The operations at block 708 may include distributing for access by a third set of one or more network entities, an aggregate set of CA certificates that includes the first set of one or more CA certificates and the second set of one or more CA certificates. The third set of one or more network entities may access the aggregate set of CA certificates and may utilize the first set of one or more CA certificates of the aggregate set of CA certificates to authenticate a first set of one or more entity certificates issued by the first CA to the first set of one or more network entities. Additionally, or in the alternative, the third set of one or more network entities may utilize the second set of one or more CA certificates of the aggregate set of CA certificates to authenticate a second set of one or more entity certificates issued by the second CA to the second set of one or more network entities.

In one example, the third set of one or more network entities may use the first set of one or more CA certificates in the aggregate set of CA certificates to establish trust with the first CA. Additionally, or in the alternative, the third set of one or more network entities may use the second set of one or more CA certificates in the aggregate set of CA certificates to establish trust with the second CA. In one example, the first CA may be untrusted by the second set of one or more network entities, and/or the second CA may be untrusted by the first set of one or more network entities. Additionally, or in the alternative, the first CA may be untrusted by the third set of one or more network entities prior to the third set of one or more network entities using at least one first CA certificate of the first set of one or more CA certificates from the aggregate set of CA certificates to authenticate at least a first entity certificate of first set of one or more entity certificates issued by the first CA. Addition- ally, or in the alternative, the second CA may be untrusted by the third set of one or more network entities prior to the third set of one or more network entities using at least one second CA certificate of the second set of one or more CA certificates from the aggregate set of CA certificates to authenticate at least a second entity certificate of second set of one or more entity certificates issued by the second CA.

In one example, the first set of one or more network entities may be located in the first trust zone, and the second set of one or more network entities are located in the second trust zone. Additionally, or in the alternative, the third set of one or more network entities may be located in the first trust zone, or the second trust zone. Additionally, or in the alternative, the third set of one or more network entities may be located in a third trust zone. In one example, the first trust zone may include a first ancillary region and/or a first ancillary VCN, the second trust zone may include a second ancillary region and/or a second ancillary VCN, and the third trust zone may include a home region and/or a home VCN. Alternatively, the first trust zone may include a home region or a home VCN, the second trust zone may include a first ancillary region and/or a first ancillary VCN, and the third trust zone may include a second ancillary region and/or a second ancillary VCN.

In one example, the operations 700 may include aggregating CA certificates for use by an interzone CA service. The interzone CA service may use the aggregate set of CA certificates to authenticate network entities in connection with initially provisioning and/or updating interzone network entities that may communicate with other network entities located outside of a particular trust zone. The particular trust zone may include all or a portion of a virtual cloud network. Additionally, or in the alternative, the trust zone may include a plurality of virtual cloud networks. Additionally, or in the alternative, the particular trust zone may include a region that includes one or more virtual cloud networks. In one example, the third set of one or more network entities may include an intermediate service host. In one example, the intermediate service host may authenticate the first set of one or more entity certificates and the second set of one or more entity certificates. Subsequent to the intermediate service host authenticating the first set of one or more entity certificates and the second set of one or more entity certificates, the first set of one or more network entities and the second set of one or more network entities may communicate and/or exchange data across at least one trust zone boundary via the intermediate service host.

The operations at block 702 may include receiving, from a first intrazone CA service associated with a first intrazone CA of a first trust zone, a first set of one or more first intrazone CA certificates issued by the first intrazone CA. The first intrazone CA may be trusted by a first set of one or more network entities located in the first trust zone. Additionally, or in the alternative, operations at block 702 may include receiving, from a second intrazone CA service located in a second intrazone CA of a second trust zone, a second set of one or more second intrazone CA certificates issued by the second intrazone CA. The second intrazone CA may be trusted by a second set of one or more network entities located in the second trust zone. The operations at block 706 may include aggregating in a certificate repository, the first set of one or more first intrazone CA certificates and the second set of one or more second intrazone CA certificates.

The operations at block 708 may include distributing for access by one or more interzone network entities, an aggregate set of CA certificates that includes the first set of one or more first intrazone CA certificates and the second set of one or more second intrazone CA certificates. The one or more interzone network entities may access the aggregate set of CA certificates and may utilize the first set of one or more first intrazone CA certificates of the aggregate set of CA certificates to authenticate a first set of one or more entity certificates issued by the first intrazone CA to the first set of one or more network entities. Additionally, or in the alternative, the one or more interzone network entities may utilize use the second set of one or more second intrazone CA certificates of the aggregate set of CA certificates to authenticate a second set of one or more entity certificates issued by the second intrazone CA to the second set of one or more network entities.

In one example, the operations 700 may include aggregating CA certificates for use by network entities that engage in interzone communications. The network entities may use the aggregate set of CA certificates to authenticate intrazone network entities and/or interzone network entities. The operations 700 with respect to aggregating CA certificates for use by network entities that engage in interzone communications may be performed in addition, or in the alternative to, the operations 700 aggregating CA certificates for use by an interzone CA service.

The operations at block 702 may include receiving, from an intrazone CA service associated with an intrazone CA of a first trust zone, a first set of one or more intrazone CA certificates issued by the intrazone CA. The intrazone CA may be trusted by a first set of one or more intrazone network entities located in the first trust zone. Additionally, or in the alternative, operations at block 702 may include receiving, from an interzone CA service located in an interzone CA of a second trust zone, a second set of one or more interzone CA certificates issued by the interzone CA. The interzone CA may be trusted by a second set of one or more interzone network entities located in the second trust zone. The operations at block 706 may include aggregating in a certificate repository, the first set of one or more intrazone CA certificates and the second set of one or more interzone CA certificates.

The operations at block 708 may include distributing for access by a third set of one or more network entities, an aggregate set of CA certificates that includes the first set of one or more intrazone CA certificates and the second set of one or more interzone CA certificates. The third set of one or more network entities may be located in the first trust zone. Alternatively, the third set of one or more network entities may be located in the second trust zone. Alternatively, the third set of one or more network entities may be located in a third trust zone. The third set of one or more network entities may access the aggregate set of CA certificates and utilize the first set of one or more intrazone CA certificates of the aggregate set of CA certificates to authenticate a first set of one or more entity certificates issued by the intrazone CA to the first set of one or more intrazone network entities. Additionally, or in the alternative, the third set of one or more network entities may access the aggregate set of CA certificates and utilize the second set of one or more interzone CA certificates of the aggregate set of CA certificates to authenticate a second set of one or more entity certificates issued by the interzone CA to the second set of one or more interzone network entities.

6. Authenticating Network Entities

Network entities may utilize the CA certificates in a certificate bundle to authenticate other network entities associated with the virtual cloud network. For example, communications between network entities may be conducted according to a security protocol. The security protocol may include authenticating a network entity based on an entity certificate issued to the network entity by a CA, for example, prior to establishing communications with the network entity.

As used herein, the term "certificate bundle" refers to a file that contains one or more digital certificates. In one example, the one or more digital certificates in a certificate bundle may include CA certificates, such as root CA certificates or intermediate CA certificates.

In one example, the entity certificate and a CA certificate corresponding to the CA that issued the entity certificate may represent at least a portion of a certificate chain. To authenticate the network entity, each signature-key pair in the certificate chain is validated. In one example, a top-level CA may issue the entity certificate, in which case the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate, and the public key of the intermediate CA; and (ii) the digital signature of the root CA in the intermediate CA certificate, and the public key of the root CA.

As used herein, the term "certificate authority certificate" or "CA certificate" refers to a digital certificate issued by a CA to establish its own identity and authenticity. A CA certificate issued by a CA may include a public key corresponding to a private key held by the CA. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

In one example, an entity certificate may be an instance principal certificate. As used herein, the term "instance principal certificate" refers to a digital certificate used to authenticate and secure communication for an instance or VM associated with a virtual cloud network. In one example, instances and VMs may be created, scaled, and terminated dynamically. Instance principal certificates may be associated with an instance or VM during its lifecycle and may be automatically generated and managed by the virtual cloud network infrastructure. An instance principal certificate may have limited access to communicate with certain network entities based on permissions assigned to the network entity to which the instance principal certificate is issued.

As used herein, the term "digital certificate" refers to a digitally signed electronic document that binds a public key to the identity of an entity or certificate holder. The entity or certificate holder may hold a private key corresponding to the public key. The public key may be included in or associated with the digital certificate. The digital certificate may be validated by matching the public key to the private key through the use of cryptography. A digital certificate may conform to International Telecommunication Union standard X.509. A digital certificate may include an issuer's name, a certificate holder's name, a public key, issuer (CA) information, and expiration date. Digital certificates may be used in various security protocols, such as SSL/TLS, to establish the identity and authenticity of the communicating parties and facilitate secure communication.

7. Miscellaneous; Extensions

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Further aspects of the presently disclosed subject matter are provided by the following clauses:

One or more non-transitory computer-readable media storing instructions, which when executed by one or more hardware processors, cause performance of operations comprising: receiving, from a first intrazone certificate authority (CA) service associated with a first intrazone CA of a first trust zone, a first set of one or more first intrazone CA certificates issued by the first intrazone CA, wherein the first intrazone CA is trusted by a first set of one or more network entities associated with the first trust zone; receiving, from a second intrazone CA service associated with a second intrazone CA of a second trust zone, a second set of one or more second intrazone CA certificates issued by the second intrazone CA, wherein the second intrazone CA is trusted by a second set of one or more network entities associated with the second trust zone; aggregating in a certificate repository, the first set of one or more first intrazone CA certificates and the second set of one or more second intrazone CA certificates; distributing for access by one or more interzone network entities, an aggregate set of CA certificates comprising the first set of one or more first intrazone CA certificates and the second set of one or more second intrazone CA certificates, wherein the one or more interzone network entities (a) use the first set of one or more first intrazone CA certificates to authenticate a first set of one or more entity certificates issued by the first intrazone CA to the first set of one or more network entities and (b) use the second set of one or more second intrazone CA certificates to authenticate a second set of one or more entity certificates issued by the second intrazone CA to the second set of one or more network entities.

One or more non-transitory computer-readable media storing instructions, which when executed by one or more hardware processors, cause performance of operations comprising: receiving, from an intrazone certificate authority (CA) service associated with an intrazone CA of a first trust zone, a first set of one or more intrazone CA certificates issued by the intrazone CA, wherein the intrazone CA is trusted by a first set of one or more intrazone network entities associated with the first trust zone; receiving, from an interzone CA service associated with an interzone CA of a second trust zone, a second set of one or more interzone CA certificates issued by the interzone CA, wherein the interzone CA is trusted by a second set of one or more interzone network entities associated with the second trust zone; aggregating in a certificate repository, the first set of one or more intrazone CA certificates and the second set of one or more interzone CA certificates; distributing for access by a third set of one or more network entities, an aggregate set of CA certificates comprising the first set of one or more intrazone CA certificates and the second set of one or more interzone CA certificates, wherein the third set of one or more network entities (a) use the first set of one or more intrazone CA certificates to authenticate a first set of one or more entity certificates issued by the intrazone CA to the first set of one or more intrazone network entities and (b) use the second set of one or more interzone CA certificates to authenticate a second set of one or more entity certificates issued by the interzone CA to the second set of one or more interzone network entities.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media storing instructions, which when executed by one or more hardware processors, cause performance of operations comprising:
   receiving, from a first certificate authority (CA) service associated with a first CA, a first set of one or more CA certificates issued by the first CA, wherein the first CA service is located in a first trust zone, and wherein the first CA is trusted by a first set of one or more network entities;
   receiving, from a second CA service associated with a second CA, a second set of one or more CA certificates issued by the second CA, wherein the second CA service is located in a second trust zone, and wherein the second CA is trusted by a second set of one or more network entities;
   aggregating in a first certificate repository, the first set of one or more CA certificates and the second set of one or more CA certificates;
   distributing for access by a third set of one or more network entities, an aggregate set of CA certificates comprising the first set of one or more CA certificates and the second set of one or more CA certificates,
      wherein the third set of one or more network entities access the aggregate set of CA certificates, and (a) use the first set of one or more CA certificates of the aggregate set of CA certificates to authenticate a first set of one or more entity certificates issued by the first CA to the first set of one or more network entities and (b) use the second set of one or more CA certificates of the aggregate set of CA certificates to authenticate a second set of one or more entity certificates issued by the second CA to the second set of one or more network entities.

2. The media of claim 1, wherein the first set of one or more network entities are located in the first trust zone, and the second set of one or more network entities are located in the second trust zone.

3. The media of claim 1, wherein the third set of one or more network entities are located in at least one of: the first trust zone, or a third trust zone.

4. The media of claim 1, wherein the first trust zone comprises a home region, and wherein the second trust zone comprises an ancillary region.

5. The media of claim 1, wherein the first CA is untrusted by the second set of one or more network entities, and wherein the second CA is untrusted by the first set of one or more network entities.

6. The media of claim 1, wherein the third set of one or more network entities (a) use the first set of one or more CA certificates in the aggregate set of CA certificates to establish trust with the first CA, and (b) use the second set of one or more CA certificates in the aggregate set of CA certificates to establish trust with the second CA.

7. The media of claim 1, wherein the third set of one or more network entities comprises an intermediate service host, and
   wherein, subsequent to the intermediate service host authenticating the first set of one or more entity certificates and the second set of one or more entity certificates, the first set of one or more network entities and the second set of one or more network entities communicate and/or exchange data across at least one trust zone boundary via the intermediate service host.

8. The media of claim 1, wherein distributing the aggregate set of CA certificates for access by the third set of one or more network entities comprises:
   storing the aggregate set of CA certificates in a second certificate repository accessible, directly or indirectly, by the third set of one or more network entities.

9. The media of claim 8, wherein the second certificate repository is located in a different trust zone relative to one or more of: the first set of one or more network entities and the second set of one or more network entities.

10. The media of claim 9, wherein the second certificate repository and the third set of one or more network entities are respectively located in a third trust zone.

11. The media of claim 8, wherein distributing the aggregate set of CA certificates for access by the third set of one or more network entities comprises:
    transmitting a notification to the third set of one or more network entities, the notification indicating that the aggregate set of CA certificates is available in the second certificate repository for distribution to the third set of one or more network entities.

12. The media of claim 8, wherein distributing the aggregate set of CA certificates for access by the third set of one or more network entities comprises:
    determining that the aggregate set of CA certificates is available in the second certificate repository; and
    responsive to determining that the aggregate set of CA certificates is available in the second certificate repository:
       downloading the aggregate set of CA certificates from the second certificate repository; and
       storing the aggregate set of CA certificates in a third certificate repository accessible, directly or indirectly, by the third set of one or more network entities, wherein the third certificate repository is located in a different trust zone relative to the second certificate repository.

13. The media of claim 1,
    wherein the first trust zone comprises a first ancillary trust zone, wherein the first CA is a first intrazone CA of the first ancillary trust zone, and wherein the first set of one or more network entities are located in the first ancillary trust zone; and
    wherein the second trust zone comprises a second ancillary trust zone, wherein the second CA is a second intrazone CA of the second ancillary trust zone, and wherein the second set of one or more network entities are located in the second ancillary trust zone.

14. The media of claim 13, wherein the operations further comprise:
    initially provisioning or updating the third set of one or more network entities, wherein initially provisioning or updating the third set of one or more network entities comprises:
       receiving, from the first set of one or more network entities, the first set of one or more entity certificates, and authenticating the first set of one or more entity certificates via the first set of one or more CA certificates;
       receiving, from the second set of one or more network entities, the second set of one or more entity certificates, and authenticating the second set of one or more entity certificates via the second set of one or more CA certificates.

15. The media of claim 14, wherein initially provisioning or updating the third set of one or more network entities comprises:

storing the aggregate set of CA certificates in a third certificate repository accessible by the third set of one or more network entities.

16. The media of claim 1,
wherein the first trust zone comprises an ancillary trust zone, wherein the first CA is an intrazone CA of the ancillary trust zone, and wherein the first set of one or more network entities are located in the ancillary trust zone; and
wherein the second trust zone is a home trust zone, wherein the second CA is a home CA of the home trust zone, wherein the second set of one or more network entities are located in the home trust zone.

17. The media of claim 16, wherein the operations further comprise:
initially provisioning or updating the third set of one or more network entities, wherein initially provisioning or updating the third set of one or more network entities comprises:
receiving, from the first set of one or more network entities, the first set of one or more entity certificates, and authenticating the first set of one or more entity certificates via the first set of one or more CA certificates;
receiving, from the second set of one or more network entities, the second set of one or more entity certificates, and authenticating the second set of one or more entity certificates via the second set of one or more CA certificates.

18. The media of claim 17, wherein initially provisioning or updating the third set of one or more network entities comprises:
storing the aggregate set of CA certificates in a third certificate repository accessible by the third set of one or more network entities.

19. The media of claim 1,
wherein a first network entity, of the first set of one or more network entities, is a first intrazone network entity;
wherein a second network entity, of the second set of one or more network entities, is a second intrazone network entity;
wherein a third network entity, of the third set of one or more network entities, is an interzone network entity located in a third trust zone;
wherein the first intrazone network entity and the second intrazone network entity communicate and/or exchange data directly or indirectly with one another across a trust zone boundary in accordance with an interzone security protocol, wherein the interzone security protocol comprises the interzone network entity (a) authenticating the first intrazone network entity based at least in part on a first CA certificate, of the first set of one or more CA certificates, and (b) authenticating the second intrazone network entity based at least in part on a second CA certificate, of the second set of one or more CA certificates.

20. The media of claim 1,
wherein the first set of one or more network entities comprises an interzone network entity;
wherein the second set of one or more network entities comprises a first intrazone network entity;
wherein the third set of one or more network entities comprises a second intrazone network entity located in the second trust zone;
wherein the second intrazone network entity and the interzone network entity communicate and/or exchange data with one another across a first trust zone boundary in accordance with an interzone security protocol, wherein the interzone security protocol comprises the second intrazone network entity authenticating the interzone network entity based at least in part on a first CA certificate, of the first set of one or more CA certificates;
wherein the first intrazone network entity and the second intrazone network entity communicate and/or exchange data with one another across a second trust zone boundary in accordance with an intrazone security protocol, wherein the intrazone security protocol comprises (a), the second intrazone network entity authenticating the interzone network entity based at least in part on the first CA certificate, of the first set of one or more CA certificates and (b) the second intrazone network entity authenticating the first intrazone network entity based at least in part on a second CA certificate, of the second set of one or more CA certificates.

21. A method, comprising:
receiving, from a first certificate authority (CA) service associated with a first CA, a first set of one or more CA certificates issued by the first CA, wherein the first CA service is located in a first trust zone, and wherein the first CA is trusted by a first set of one or more network entities;
receiving, from a second CA service associated with a second CA, a second set of one or more CA certificates issued by the second CA, wherein the second CA service is located in a second trust zone, and wherein the second CA is trusted by a second set of one or more network entities;
aggregating in a first certificate repository, the first set of one or more CA certificates and the second set of one or more CA certificates;
distributing for access by a third set of one or more network entities, an aggregate set of CA certificates comprising the first set of one or more CA certificates and the second set of one or more CA certificates,
wherein the third set of one or more network entities access the aggregate set of CA certificates, and (a) use the first set of one or more CA certificates of the aggregate set of CA certificates to authenticate a first set of one or more entity certificates issued by the first CA to the first set of one or more network entities and (b) use the second set of one or more CA certificates of the aggregate set of CA certificates to authenticate a second set of one or more entity certificates issued by the second CA to the second set of one or more network entities;
wherein the method is performed by at least one device including a hardware processor.

22. The method of claim 21, wherein the first set of one or more network entities are located in the first trust zone, and the second set of one or more network entities are located in the second trust zone.

23. The method of claim 21, wherein the third set of one or more network entities are located in at least one of: the first trust zone, or a third trust zone.

24. The method of claim 21, wherein the first trust zone comprises a home region, and wherein the second trust zone comprises an ancillary region.

25. The method of claim 21, wherein the first CA is untrusted by the second set of one or more network entities, and wherein the second CA is untrusted by the first set of one or more network entities.

26. The method of claim 21, wherein the third set of one or more network entities (a) use the first set of one or more CA certificates in the aggregate set of CA certificates to establish trust with the first CA, and (b) use the second set of one or more CA certificates in the aggregate set of CA certificates to establish trust with the second CA.

27. The method of claim 21, wherein the third set of one or more network entities comprises an intermediate service host, and
  wherein, subsequent to the intermediate service host authenticating the first set of one or more entity certificates and the second set of one or more entity certificates, the first set of one or more network entities and the second set of one or more network entities communicate and/or exchange data across at least one trust zone boundary via the intermediate service host.

28. The method of claim 21, wherein distributing the aggregate set of CA certificates for access by the third set of one or more network entities comprises:
  storing the aggregate set of CA certificates in a second certificate repository accessible, directly or indirectly, by the third set of one or more network entities.

29. The method of claim 28, wherein the second certificate repository is located in a different trust zone relative to one or more of: the first set of one or more network entities and the second set of one or more network entities.

30. The method of claim 29, wherein the second certificate repository and the third set of one or more network entities are respectively located in a third trust zone.

31. The method of claim 28, wherein distributing the aggregate set of CA certificates for access by the third set of one or more network entities comprises:
  transmitting a notification to the third set of one or more network entities, the notification indicating that the aggregate set of CA certificates is available in the second certificate repository for distribution to the third set of one or more network entities.

32. The method of claim 28, wherein distributing the aggregate set of CA certificates for access by the third set of one or more network entities comprises:
  determining that the aggregate set of CA certificates is available in the second certificate repository; and
  responsive to determining that the aggregate set of CA certificates is available in the second certificate repository:
    downloading the aggregate set of CA certificates from the second certificate repository; and
    storing the aggregate set of CA certificates in a third certificate repository accessible, directly or indirectly, by the third set of one or more network entities, wherein the third certificate repository is located in a different trust zone relative to the second certificate repository.

33. The method of claim 21,
  wherein the first trust zone comprises a first ancillary trust zone, wherein the first CA is a first intrazone CA of the first ancillary trust zone, and wherein the first set of one or more network entities are located in the first ancillary trust zone; and
  wherein the second trust zone comprises a second ancillary trust zone, wherein the second CA is a second intrazone CA of the second ancillary trust zone, and wherein the second set of one or more network entities are located in the second ancillary trust zone.

34. The method of claim 21, wherein the method further comprises:
  initially provisioning or updating the third set of one or more network entities, wherein initially provisioning or updating the third set of one or more network entities comprises:
    receiving, from the first set of one or more network entities, the first set of one or more entity certificates, and authenticating the first set of one or more entity certificates via the first set of one or more CA certificates;
    receiving, from the second set of one or more network entities, the second set of one or more entity certificates, and authenticating the second set of one or more entity certificates via the second set of one or more CA certificates.

35. The method of claim 34, wherein initially provisioning or updating the third set of one or more network entities comprises:
  storing the aggregate set of CA certificates in a third certificate repository accessible by the third set of one or more network entities.

36. The method of claim 21,
  wherein the first trust zone comprises an ancillary trust zone, wherein the first CA is an intrazone CA of the ancillary trust zone, and wherein the first set of one or more network entities are located in the ancillary trust zone; and
  wherein the second trust zone comprises a home trust zone, wherein the second CA is a home CA of the home trust zone, wherein the second set of one or more network entities are located in the home trust zone.

37. The method of claim 36, wherein the method further comprises:
  initially provisioning or updating the third set of one or more network entities, wherein initially provisioning or updating the third set of one or more network entities comprises:
    receiving, from the first set of one or more network entities, the first set of one or more entity certificates, and authenticating the first set of one or more entity certificates via the first set of one or more CA certificates;
    receiving, from the second set of one or more network entities, the second set of one or more entity certificates, and authenticating the second set of one or more entity certificates via the second set of one or more CA certificates.

38. The method of claim 37, wherein initially provisioning or updating the third set of one or more network entities comprises:
  storing the aggregate set of CA certificates in a third certificate repository accessible by the third set of one or more network entities.

39. The method of claim 21,
  wherein a first network entity, of the first set of one or more network entities, is a first intrazone network entity;
  wherein a second network entity, of the second set of one or more network entities, is a second intrazone network entity;
  wherein a third network entity, of the third set of one or more network entities, is an interzone network entity located in a third trust zone;
  wherein the first intrazone network entity and the second intrazone network entity communicate and/or exchange data directly or indirectly with one another across a trust zone boundary in accordance with an interzone security protocol, wherein the interzone security protocol comprises the interzone network entity (a) authenticating the first intrazone network entity based at least in part on a first CA certificate, of the first set of one or more CA certificates, and (b) authenticating the second intrazone network entity based at least in part on a second CA certificate, of the second set of one or more CA certificates.

40. The method of claim 21,
wherein the first set of one or more network entities comprises an interzone network entity;
wherein the second set of one or more network entities comprises a first intrazone network entity;
wherein the third set of one or more network entities comprises a second intrazone network entity located in the second trust zone;
wherein the second intrazone network entity and the interzone network entity communicate and/or exchange data with one another across a first trust zone boundary in accordance with an interzone security protocol, wherein the interzone security protocol comprises the second intrazone network entity authenticating the interzone network entity based at least in part on a first CA certificate, of the first set of one or more CA certificates;
wherein the first intrazone network entity and the second intrazone network entity communicate and/or exchange data with one another across a second trust zone boundary in accordance with an intrazone security protocol, wherein the intrazone security protocol comprises (a), the second intrazone network entity authenticating the interzone network entity based at least in part on the first CA certificate, of the first set of one or more CA certificates and (b) the second intrazone network entity authenticating the first intrazone network entity based at least in part on a second CA certificate, of the second set of one or more CA certificates.

41. A system comprising:
at least one hardware processor;
the system being configured to execute operations, using the at least one hardware processor, the operations comprising:
receiving, from a first certificate authority (CA) service associated with a first CA, a first set of one or more CA certificates issued by the first CA, wherein the first CA service is located in a first trust zone, and wherein the first CA is trusted by a first set of one or more network entities;
receiving, from a second CA service associated with a second CA, a second set of one or more CA certificates issued by the second CA, wherein the second CA service is located in a second trust zone, and wherein the second CA is trusted by a second set of one or more network entities;
aggregating in a first certificate repository, the first set of one or more CA certificates and the second set of one or more CA certificates;
distributing for access by a third set of one or more network entities, an aggregate set of CA certificates comprising the first set of one or more CA certificates and the second set of one or more CA certificates,
wherein the third set of one or more network entities access the aggregate set of CA certificates, and (a) use the first set of one or more CA certificates of the aggregate set of CA certificates to authenticate a first set of one or more entity certificates issued by the first CA to the first set of one or more network entities and (b) use the second set of one or more CA certificates of the aggregate set of CA certificates to authenticate a second set of one or more entity certificates issued by the second CA to the second set of one or more network entities.

* * * * *